United States Patent
Matta et al.

(10) Patent No.: US 11,852,728 B2
(45) Date of Patent: *Dec. 26, 2023

(54) APPARATUS AND METHOD FOR REMOTE DETERMINATION OF ARCHITECTURAL FEATURE ELEVATION AND ORIENTATION

(71) Applicant: Assurant, Inc., New York, NY (US)

(72) Inventors: Rajiv Matta, Atlanta, GA (US); Ron Brusky, Miami, FL (US); Mathew Schmitt, Atlanta, GA (US); Prasanth Kambhatla, Atlanta, GA (US)

(73) Assignee: ASSURANT, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,900

(22) Filed: Sep. 16, 2022

(65) Prior Publication Data

US 2023/0083833 A1    Mar. 16, 2023

Related U.S. Application Data

(63) Continuation of application No. 16/402,974, filed on May 3, 2019, now Pat. No. 11,480,683.

(60) Provisional application No. 62/666,341, filed on May 3, 2018.

(51) Int. Cl.
G01S 17/89 (2020.01)
G01S 17/95 (2006.01)
G01S 17/46 (2006.01)

(52) U.S. Cl.
CPC .............. *G01S 17/89* (2013.01); *G01S 17/46* (2013.01); *G01S 17/95* (2013.01)

(58) Field of Classification Search
CPC .......... G01S 17/89; G01S 17/46; G01S 17/95
See application file for complete search history.

(56) References Cited

U.S. PATENT DOCUMENTS

| | | | |
|---|---|---|---|
| 8,208,689 B2 | 6/2012 | Savolainen et al. | |
| 8,483,422 B2 | 7/2013 | Welker et al. | |
| 8,760,285 B2 | 6/2014 | Billman et al. | |
| 2007/0077540 A1* | 4/2007 | Testrake | G09B 9/08 434/37 |
| 2012/0309408 A1* | 12/2012 | Marti | G01S 5/0236 455/456.1 |
| 2013/0197807 A1 | 8/2013 | Du et al. | |
| 2013/0262152 A1 | 10/2013 | Collins et al. | |

(Continued)

OTHER PUBLICATIONS

U.S. Appl. No. 16/402,974, filed Sep. 16, 2022, U.S. Pat. No. 11,480,6683, Issued.

(Continued)

*Primary Examiner* — Tan Q Nguyen
(74) *Attorney, Agent, or Firm* — ALSTON & BIRD LLP

(57) ABSTRACT

An apparatus, method, and computer program product are provided for the improved and automatic prediction of an elevation of an architectural feature of a structure at a particular geographic location. Some example implementations employ predictive, machine-learning modeling to facilitate the use of LiDAR-derived ground-elevation data, additional location context data, and elevation data from comparator locations to extrapolate and otherwise predict the elevation or other position of a given architectural feature of structure.

21 Claims, 13 Drawing Sheets

(56) References Cited

U.S. PATENT DOCUMENTS

| | | |
|---|---|---|
| 2014/0132723 A1 | 5/2014 | More |
| 2015/0346313 A1* | 12/2015 | Smith .................. G01S 5/02524 342/465 |
| 2016/0300375 A1 | 10/2016 | Beckett et al. |
| 2017/0070971 A1 | 3/2017 | Wietfeldt et al. |
| 2021/0192629 A1 | 6/2021 | Tofte et al. |

OTHER PUBLICATIONS

Sanborn, Mobile Mapping Optech LYNX V200 Mobile Mapping System, [article, online], 2014, [retrieved Aug. 2, 2019], retrieved from the Internet <URL: https://www.google.com/search?q=Mobile+Mapping+Optech+LYNX+V200+Mobile+Mapping+System, 4 pages.

* cited by examiner

APPARATUS AND METHOD FOR REMOTE DETERMINATION OF ARCHITECTURAL FEATURE ELEVATION AND ORIENTATION

CROSS-REFERENCE TO RELATED APPLICATIONS

This application is a continuation of U.S. application Ser. No. 16/402,974, filed May 3, 2019, and entitled "Apparatus and Method for Remote Determination of Architectural Feature Elevation and Orientation", which application claims the benefit under 35 U.S.C. § 119 of U.S. Provisional Application Ser. No. 62/666,341 Filed May 3, 2018, and entitled "Apparatus and Method for Remote Determination of Architectural Feature Elevation and Orientation", each of which is hereby incorporated by reference herein in its entirety.

TECHNICAL FIELD

An example embodiment relates generally to surveying, such as LiDAR-based surveying, and other topological measurement systems, particularly in the context of assessing the elevation and orientation of architectural features of structures erected on particular parcels of land. Example implementations are particularly directed to systems, methods, and apparatuses for remotely determining the likely elevation and orientation of architectural features without door-to-door surveying.

BACKGROUND

Effectively preparing for the damage to land, buildings, and other structures caused by floods has challenged individuals and communities for centuries. As the populations of coastal regions and other areas susceptible to flood events have grown, so too has the need to effectively assess the risks to people and property posed by such flood events. The inventors of the invention disclosed herein have identified technical challenges associated with efficiently determining the elevation and orientation of architectural features of structures erected on particular parcels of land, and developed the solutions described and otherwise referenced herein.

BRIEF SUMMARY

An apparatus, computer program product, and method are therefore provided in accordance with an example embodiment in order permit the efficient determination of an elevation position of an architectural feature of a structure. In this regard, the method, apparatus and computer program product of an example embodiment provide for the creation of a predicted feature position data set that can be stored within a renderable object and otherwise presented to a user via an interface of a client device. Moreover, the method, apparatus, and computer program product of an example embodiment provide for use of the machine learning model in connection with the determination and retrieval of a predicted feature elevation position set determined based at least in part on location context data associated with a target geographic location and location context data associated with one or more other geographic locations.

In an example embodiment, an apparatus is provided, the apparatus comprising a processor and a memory, the memory comprising instructions that configure the apparatus to: receive a message request data object from a client device associated with a user; extract, from the message request data object, a location identification data set, wherein the location identification data set is associated with a first geographic location; receive a first location context data object, wherein the first location context data object is associated with the first geographic location; receive a second location context data object, wherein the second location context data object is associated with a second geographic location; retrieve a predicted feature elevation position data set, wherein retrieving the predicted feature elevation position data set comprises applying the location identification data set, the first location context data object, and the second location context data object to a first model; and generate a control signal causing a renderable object comprising the predicted feature position data set to be displayed on a user interface of the client device associated with the user.

In some example implementations of such an apparatus, the message request data object comprises an authenticated indication of the identity of the user. In some such example implementations, and in other example implementations, the location identification data set comprises a geographic coordinates set for the first geographic location. In some such example implementations, the geographic coordinates set define a location of an architectural feature of a structure located at the first geographic location.

In some example implementations of such an apparatus, the first location context data object comprises a light detection and ranging (LiDAR) data set associated with the first geographic location. In some such example implementations, and in other example implementations, the first location context data object further comprises a land use data set associated with the first geographic location. In some such example implementations, the first location context data object further comprises a property characteristic dataset, which may include information regarding the foundation type, date of construction, construction materials used, and/or other information that may be obtained from databases associated with permitting, taxation, and/or other sources, for example. In some such example implementations, the first location context data object further comprises a land coverage data set associated with the first geographic location. In some such example implementations, the first location context data object further comprises a census data set associated with the first geographic location.

In some example implementations of such an apparatus, the second location context data object comprises an identification of an elevation position of an architectural feature of a structure located at the second geographic location. In some such example implementations, and in other example implementations, the first model is a geospatial machine learning model. In some such example implementations, and in other example implementations, retrieving a predicted feature position data set comprises: applying the location identification data set, the first location context data object, and the second location context data object to the geospatial machine learning model; and determining, by the geospatial machine learning model, a predicted location of a finished floor of the structure located at the first geographic location.

In another example embodiment, a computer program product is provided, the computer program product comprising at least one non-transitory computer-readable storage medium having computer-executable program code instructions stored therein, the computer-executable program code instructions comprising program code instructions configured to: receive a message request data object from a client device associated with a user; extract, from the message request data object, a location identification data set, wherein the location identification data set is associated with a first geographic location; receive a first location context data object, wherein the first location context data object is associated with the first geographic location; receive a second location context data object, wherein the second location context data object is associated with a second geographic location; retrieve a predicted feature elevation position data set, wherein retrieving the predicted feature elevation position data set comprises applying the location identification data set, the first location context data object, and the second location context data object to a first model; and generate a control signal causing a renderable object comprising the predicted feature position data set to be displayed on a user interface of the client device associated with the user.

In another example embodiment, a method for predicting the elevation of an architectural feature of a structure is provided, the method comprising: receiving a message request data object from a client device associated with a user; extracting, from the message request data object, a location identification data set, wherein the location identification data set is associated with a first geographic location; receiving a first location context data object, wherein the first location context data object is associated with the first geographic location; receiving a second location context data object, wherein the second location context data object is associated with a second geographic location; retrieving a predicted feature elevation position data set, wherein retrieving the predicted feature elevation position data set comprises applying the location identification data set, the first location context data object, and the second location context data object to a first model; and generating a control signal causing a renderable object comprising the predicted feature position data set to be displayed on a user interface of the client device associated with the user.

In yet another example embodiment, a method, system, and apparatus of supplementing an incomplete dataset and generating a model based thereon may be provided. The incomplete dataset may lack one or more data objects (e.g., important features) relevant to a machine learning model. The method may include cleaning and integrating ranging data objects (e.g., a LiDAR data object) with the dataset and interpolating or otherwise generating new variables based on the ranging data objects. In some embodiments, the ranging data objects may be added directly to the dataset as an additional variable.

BRIEF DESCRIPTION OF THE DRAWINGS

Figure 1:
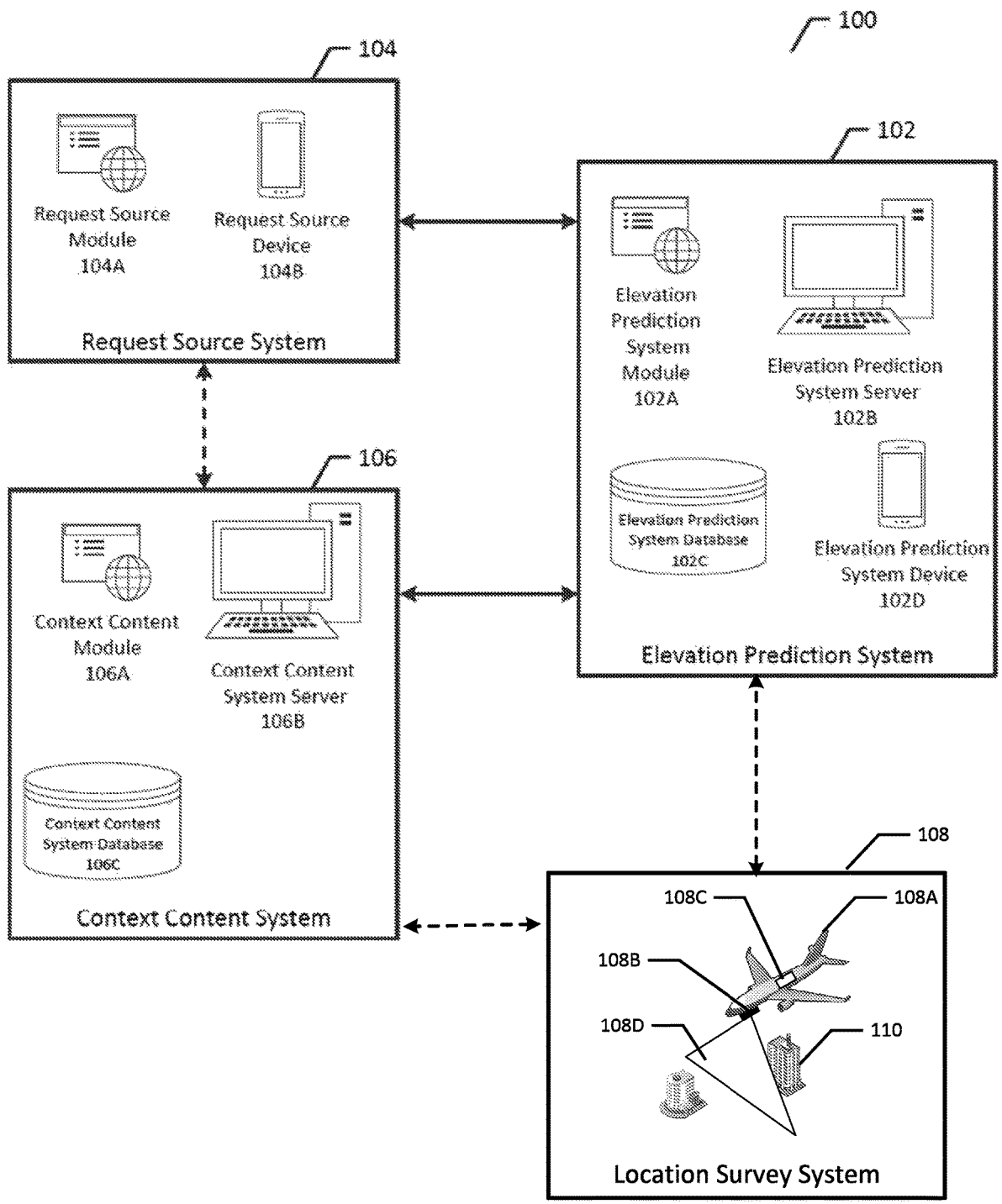
Figure 2:
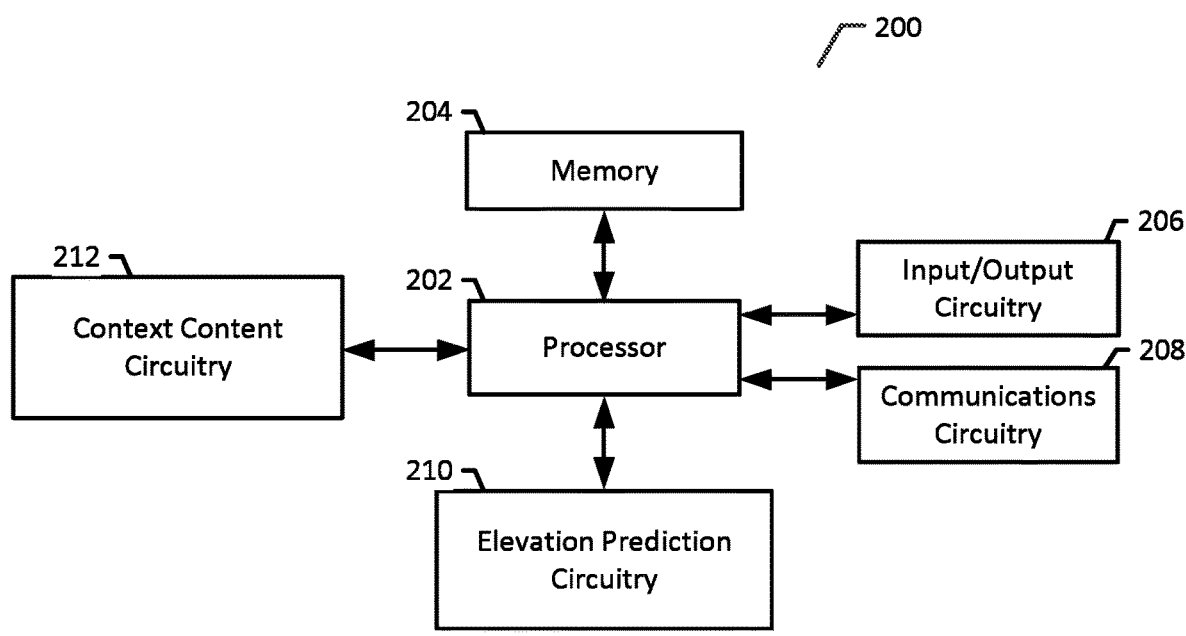
Figure 3:
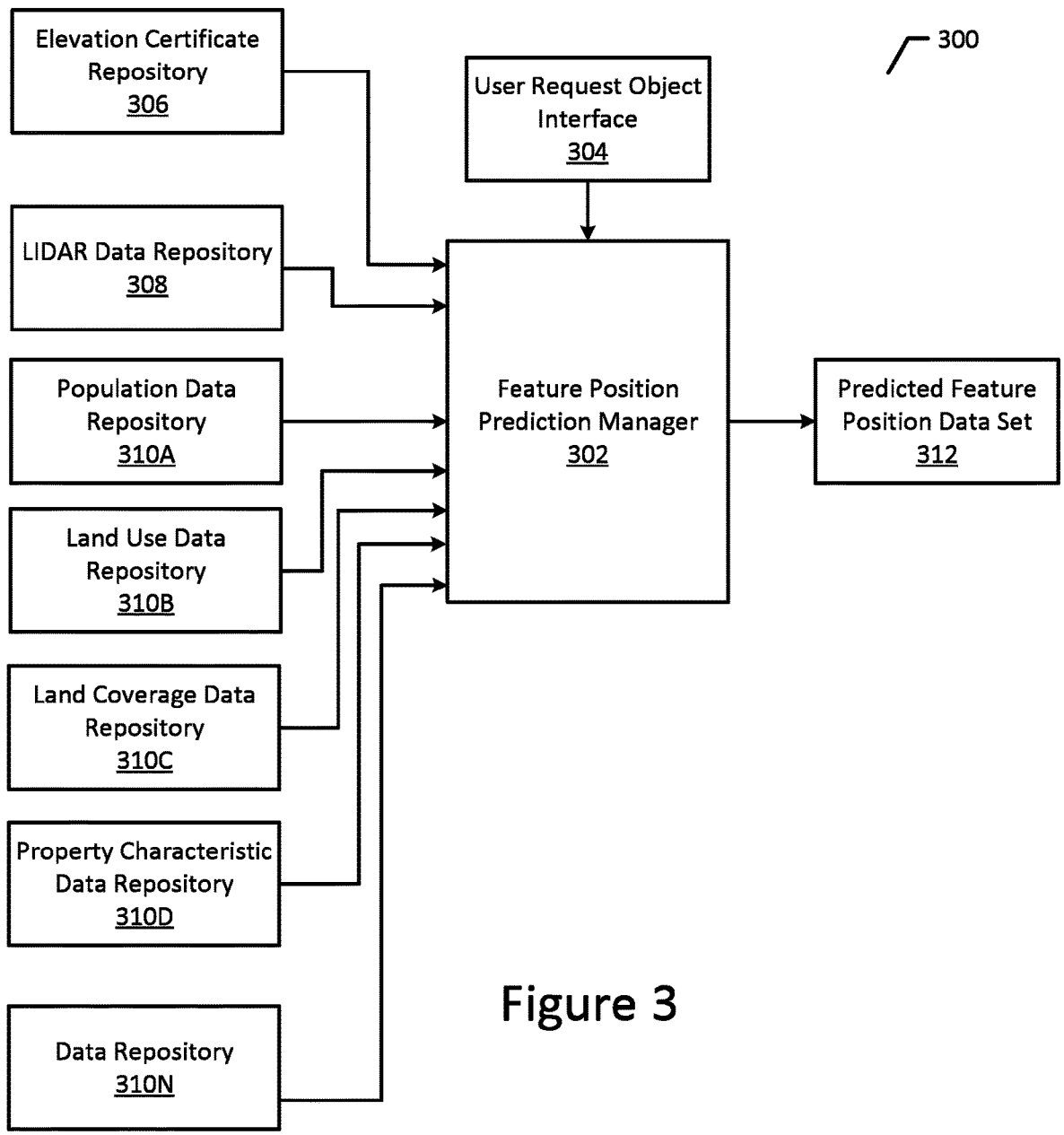
Figure 4:
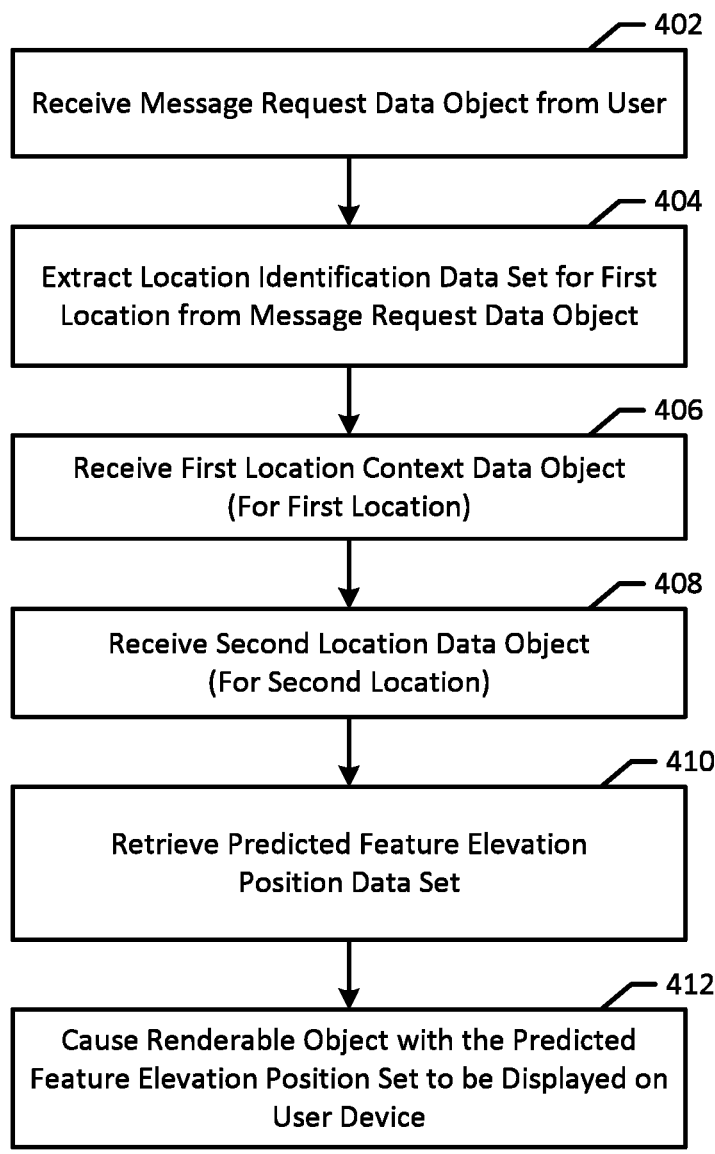
Figure 5:
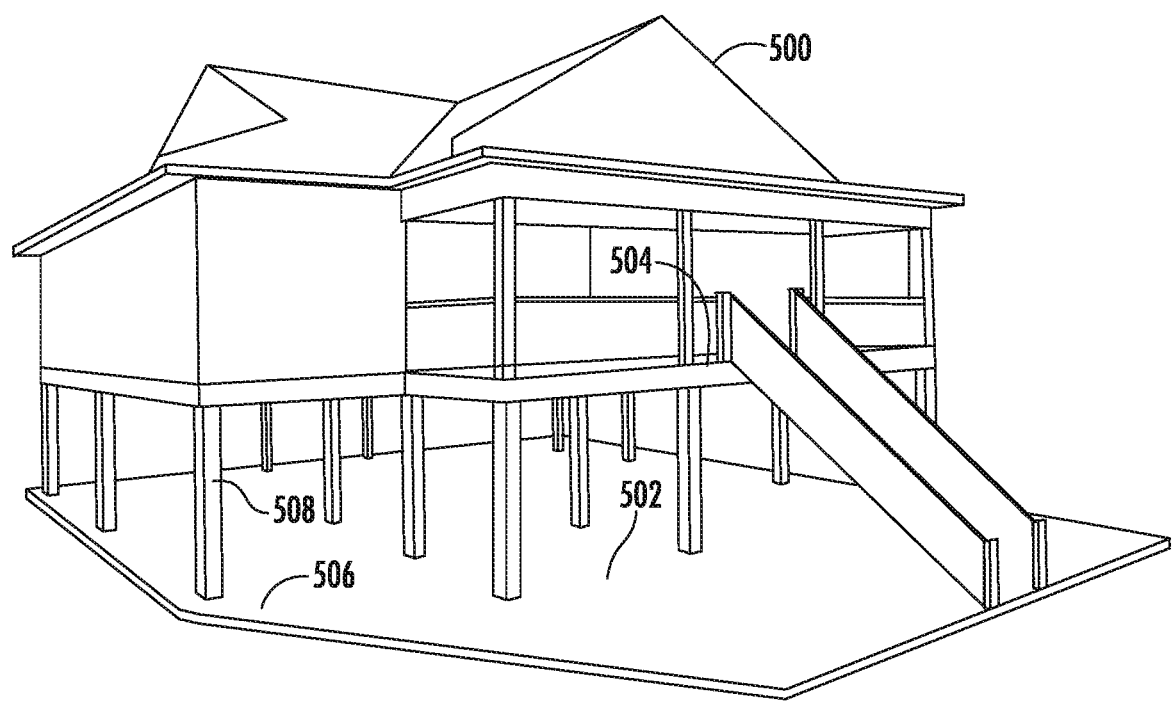
Figure 6:
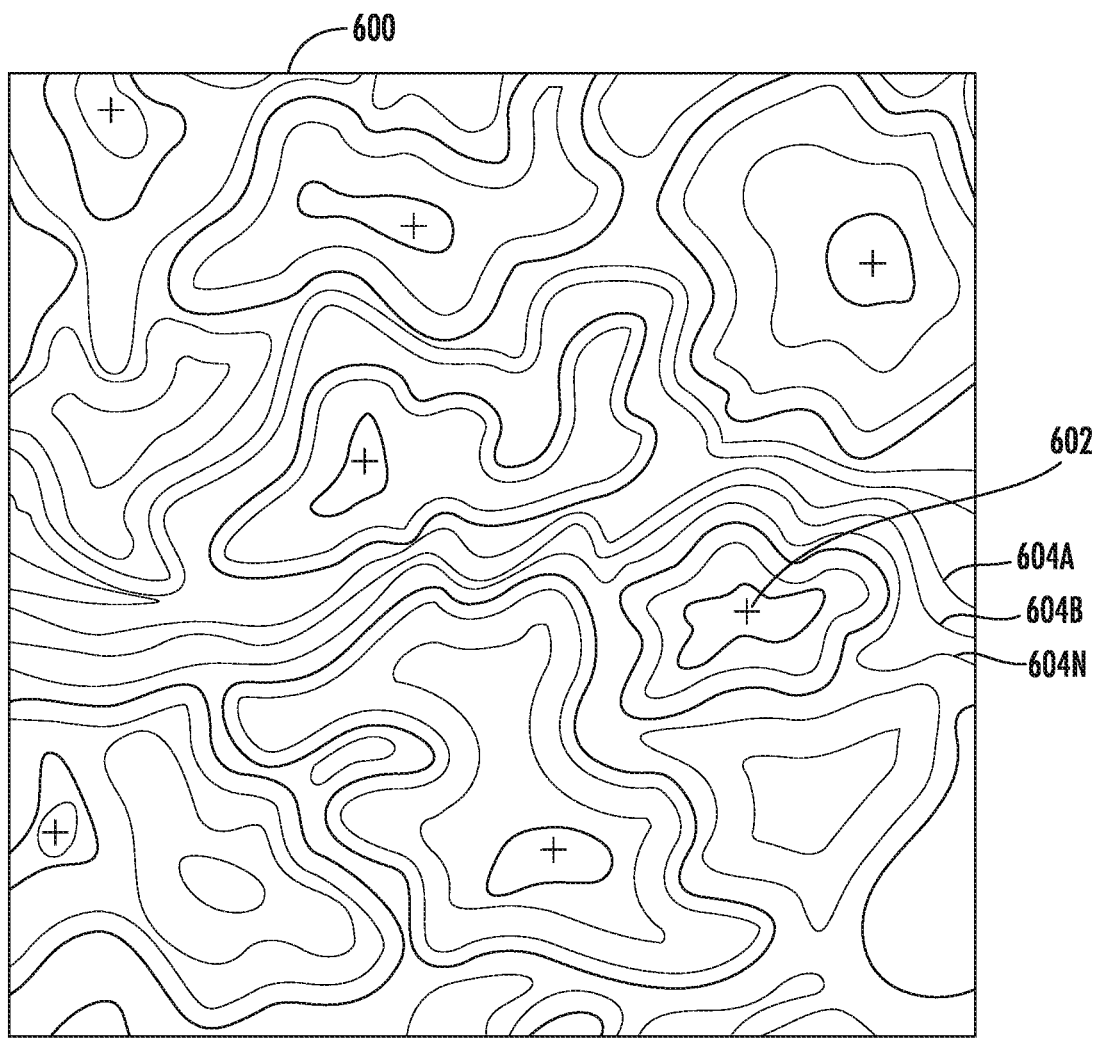
Figure 7:
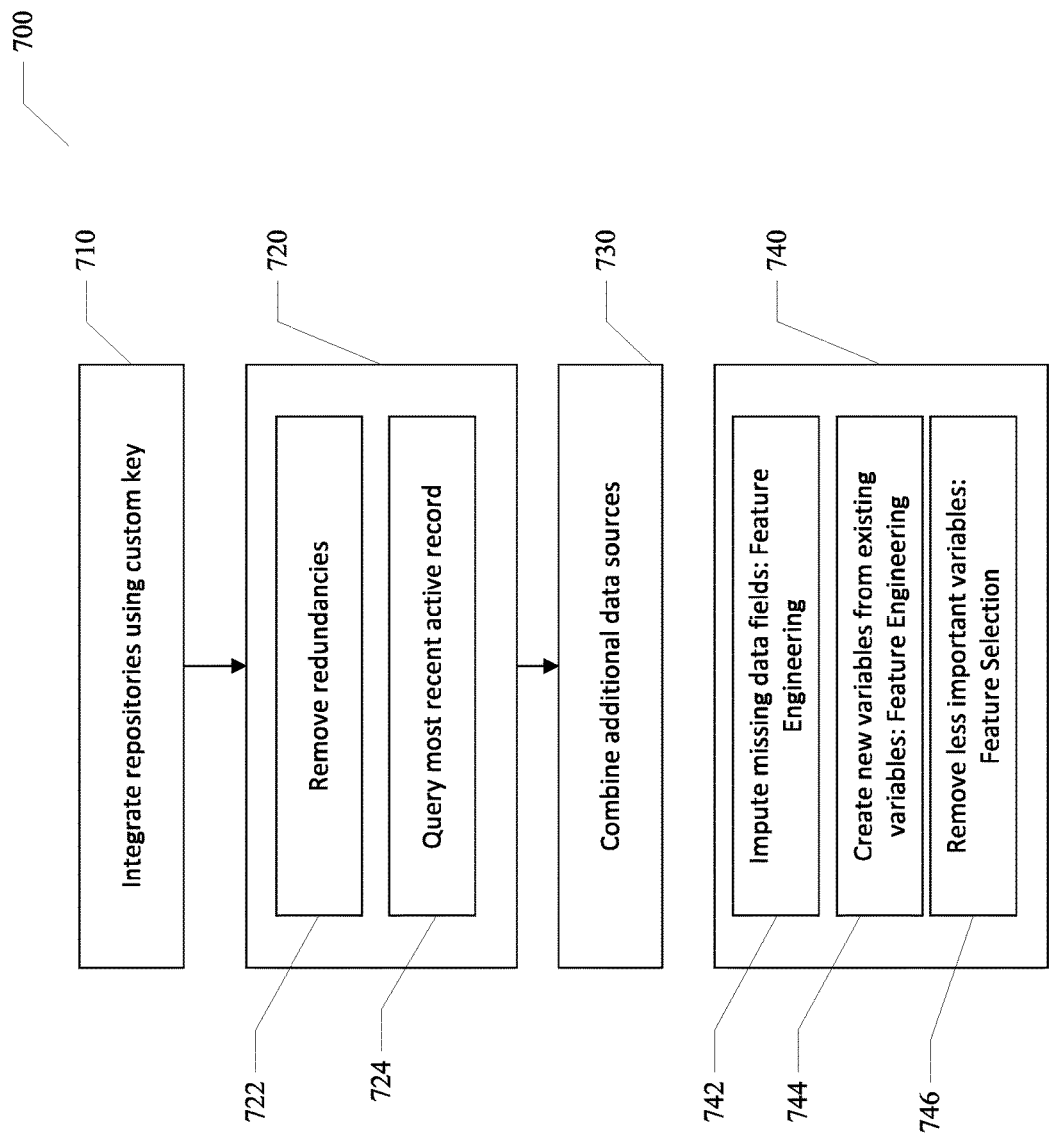
Figure 8:
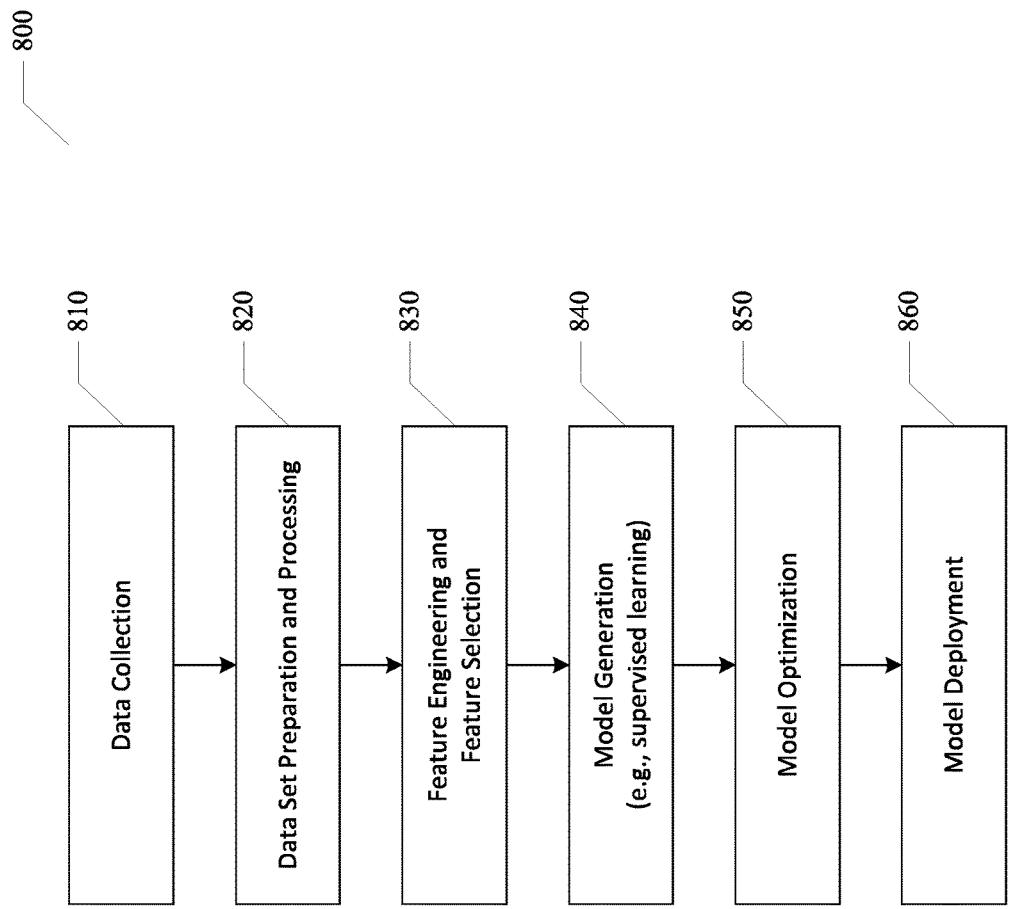
Figure 9:
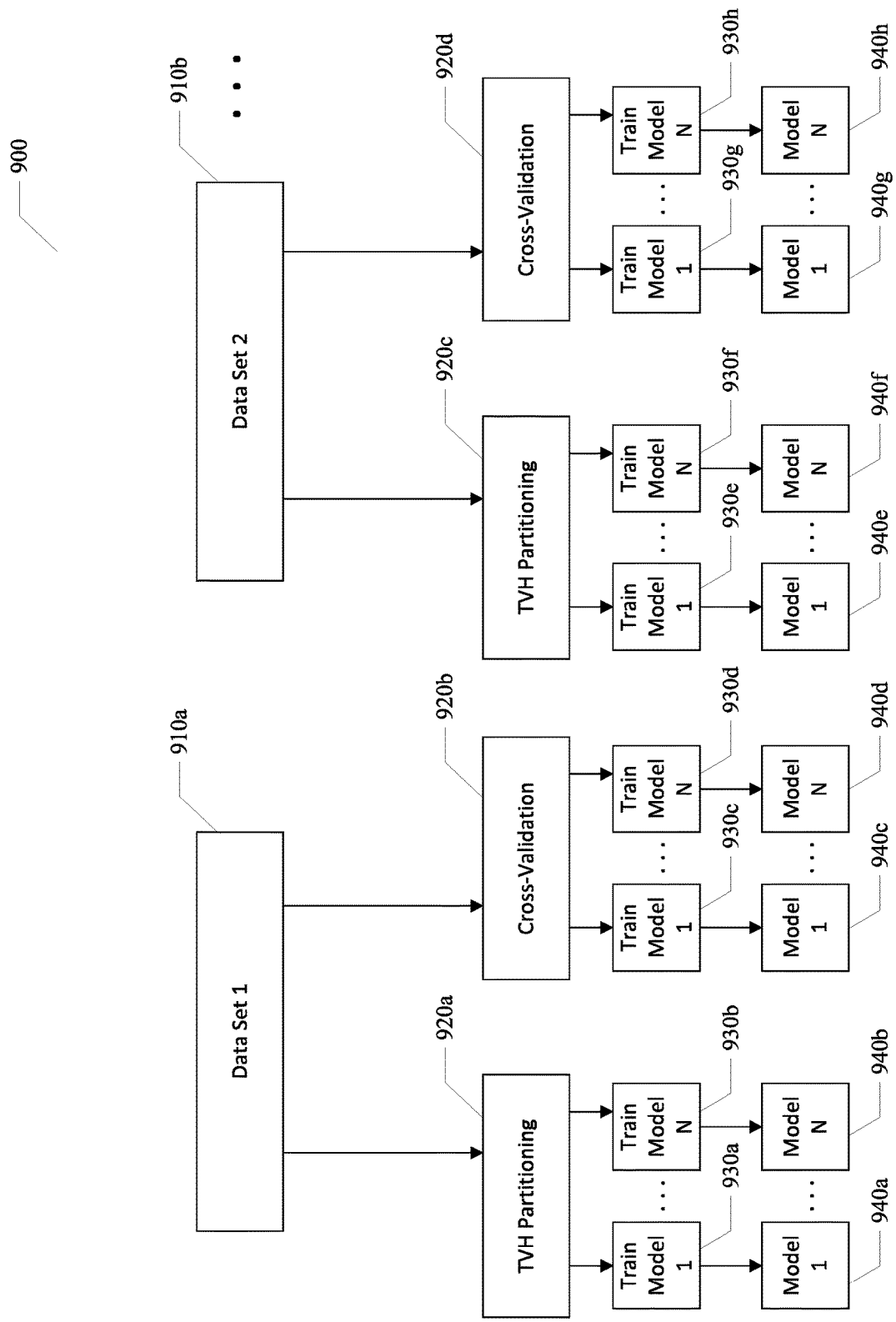
Figure 10:
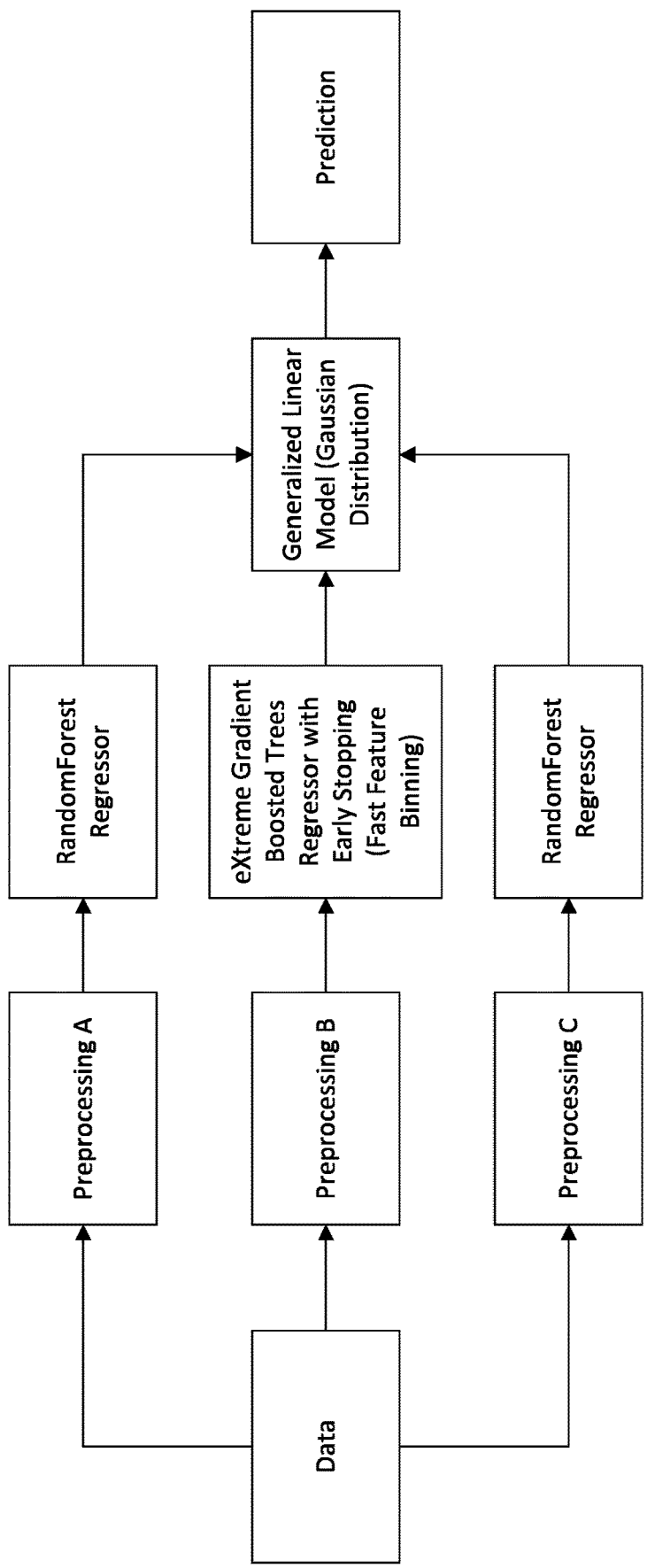
Figure 11:
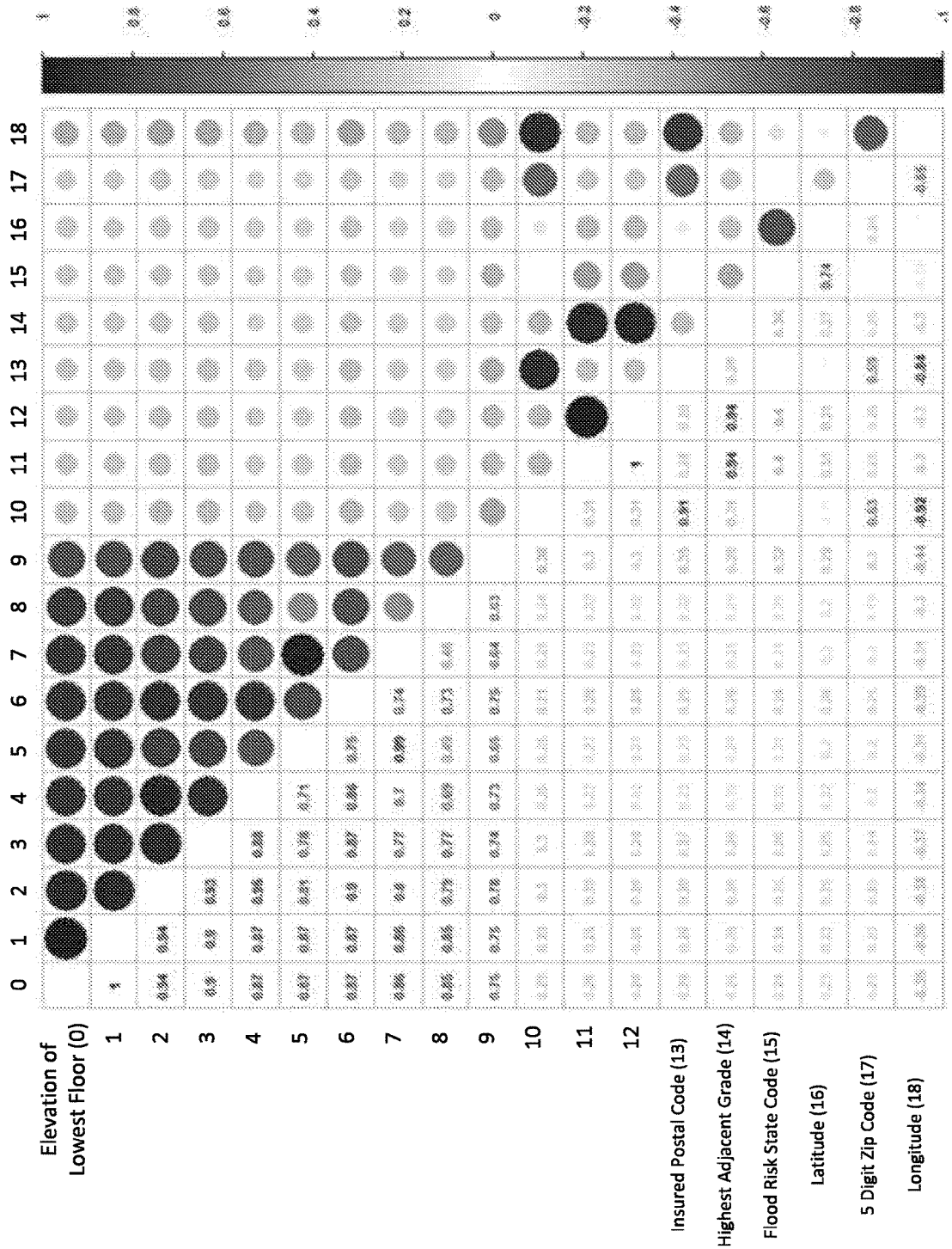
Figure 12:
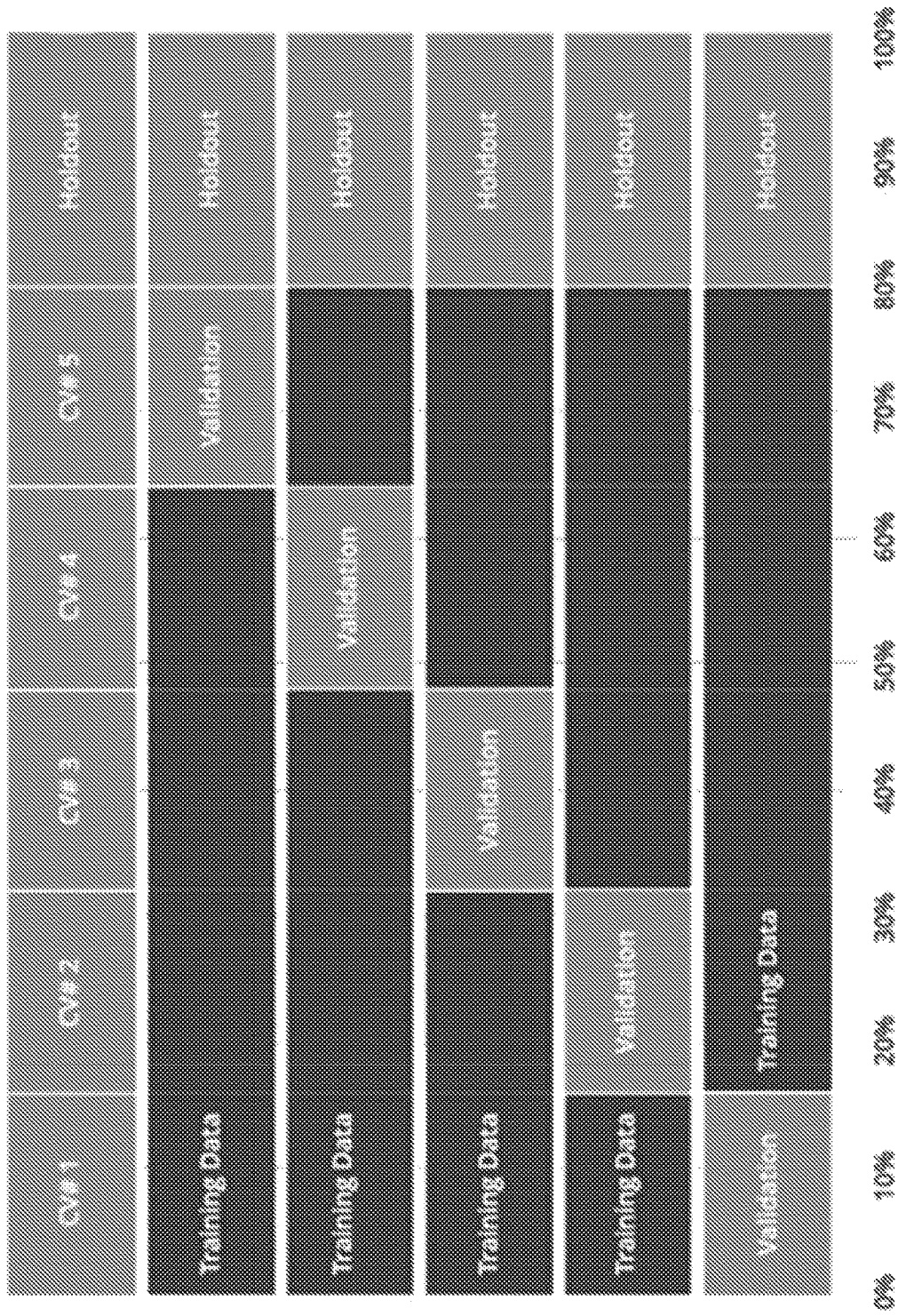
Figure 13:
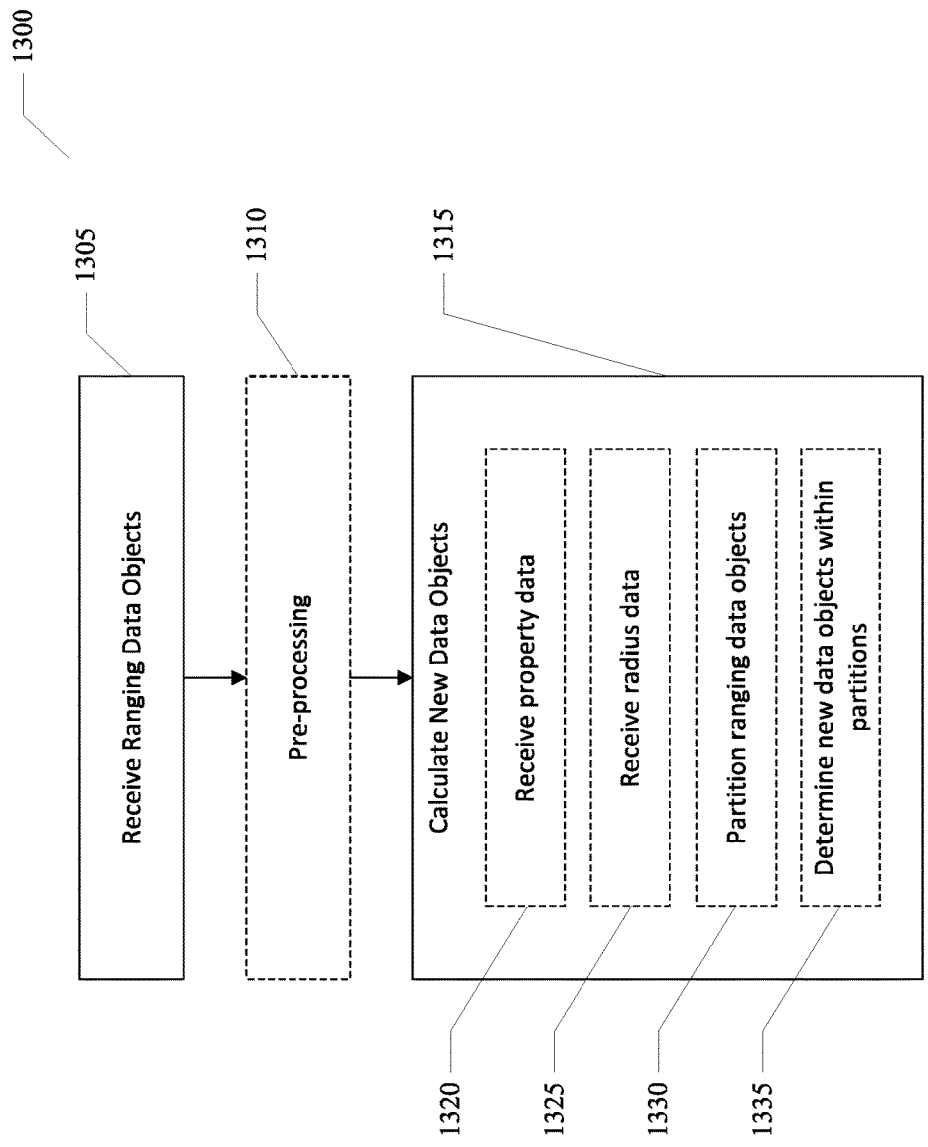

Having thus described certain embodiments of the present invention in general terms, reference will now be made to the accompanying drawings, which are not necessarily drawn to scale, and wherein:

FIG. 1 illustrates an example system within which some embodiments of the present invention may operate;

FIG. 2 illustrates a block diagram of an example device for implementing a data object generation system using special-purpose circuitry in accordance with some embodiments of the present invention;

FIG. 3 illustrates an example data flow interaction between elements of an example device for generating predicted feature position data sets based on a modeled prediction of the position or orientation of an architectural feature at a given geographic location in accordance with some embodiments of the present invention;

FIG. 4 illustrates a flowchart describing example operations for generating predicted feature position data sets based on a modeled prediction of the position or orientation of an architectural feature at a given geographic location in accordance with some embodiments of the present invention;

FIG. 5 illustrates an example depiction of a structure located on a parcel of land in which several of the concepts and developments described herein may be illustrated;

FIG. 6 presents an example topographical map that illustrates some of the LiDAR and other topographical data sets used in connection with some embodiments of the present invention;

FIG. 7 illustrates a flowchart describing example data processing operations in accordance with some embodiments of the present invention;

FIG. 8 illustrates a flowchart describing example model generation operations in accordance with some embodiments of the present invention;

FIG. 9 illustrates a flowchart describing example model training operations in accordance with some embodiments of the present invention;

FIG. 10 illustrates a flowchart describing example model and prediction process in accordance with some embodiments of the present invention;

FIG. 11 presents a correlation plot of numeric variables according to an example model generation process in accordance with some embodiments of the present invention;

FIG. 12 illustrates a flowchart describing cross-validation data partitioning in accordance with some embodiments of the present invention; and FIG. 13 illustrates a flowchart describing an example new data object calculation in accordance with some embodiments of the present invention.

DETAILED DESCRIPTION

Some embodiments of the present invention will now be described more fully herein with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present invention are directed to improved apparatuses, methods, and computer program products for predicting the elevation of an architectural feature of a structure in a given geographic location and, based at least in part on the predicted elevation, generating a predicted feature position data set for presentation to a user. In this regard, embodiments of the present invention provide systems, devices, and frameworks that employ predictive, machine-learning modeling to facilitate the prediction of the elevation of a portion of a structure without requiring direct measurement of the elevation, and presenting the predicted elevation in a manner that can be used in connection with preparation, planning, and resource deployment for flood events. Embodiments of the present invention use LiDAR scan returns to calculate new data objects for generating the model. Embodiments discussed herein may be capable of predicting structural elevation for a desired location without an elevation certificate, and the predictions may be made on-demand without requiring a separate visit to the site.

The inventors of the invention disclosed herein have recognized that one of the key factors in estimating the risk to persons and property posed by flood events is the elevation of particular architectural features of buildings and other structures placed in a given geographic location, which particular elevation data may not be readily available for every structure or geographic location. For example, the elevation of the first finished floor of a structure tends to be more closely correlated to risks of severe damage to a person's well-being and property than the baseline elevation of the underlying land. The elevation and/or other position of other architectural features (such as whether the foundation of a structure incorporates a basement, crawl space, and/or other space, for example) may also inform an assessment of the risk posed to the structure by a flood event. Consequently, risk determinations, preparedness efforts, and resource allocations associated with flood events can be made more effective and efficient by taking into account the elevation and/or other position of one or more architectural features of the structures present in a given location. However, determining the elevation and/or other position of such architectural features in an efficient and accurate manner imposes a number of technical challenges, particularly in locations where population densities and/or structural densities (i.e., the number of structures in a given area) are high, and in locations where structures are frequently removed, rebuilt, renovated, and/or otherwise altered.

As recognized by the inventors of the invention disclosed herein, the technical challenges associated with predicting and modeling the elevation and/or other position of architectural features of structures in a given location are compounded by a wide range of information occlusion factors. In areas that are prone to flooding, the characteristics of structures may change over time, particularly if the structures that were previously in place in a given location are prone to being damaged, repaired, and/or replaced. In many locations, there is no single existing data set that accurately expresses the elevation of the relevant architectural features for the structures in a wide area, and many pre-existing databases only include ground elevation data for the limited number of properties they cover. Moreover, even in areas where multiple data sets may be combined to calculate an estimated elevation with a wide margin of error, the data may exist only on paper, and is not stored in a format that can be readily processed or verified. In the few specific locations where an elevation certificate and/or other official measurement of the elevation of structure may exist, the information contained in such a certificate is also often only stored in a physical format and is not subjected to subsequent updating and/or verification processes. In areas where reasonably accurate topographical and/or other geographic data is available in useable data sets, that data typically shows the elevation and/or other features of the underlying geography, not the elevation of the structures built on the land.

The technical challenges associated with accurately and efficiently determining the elevation and/or other position of architectural features of structures, including those challenges associated with acquiring useable and accurate data related to the elevation and/or position of architectural features of a structure, are compounded by the technical challenges associated with the traditional approaches to ascertaining the elevation and/or other position of an architectural feature of a structure. Traditionally, determining the elevation of a feature of a structure requires the use of surveying equipment operated by a trained surveyor. This approach is expensive, time consuming, and often impractical, particularly in areas where population densities, structural densities, traffic, and/or other factors impede the ability of the surveyor to quickly and accurately capture the required measurements. In situations where a formal survey is unavailable, other traditional approaches to estimating the elevation of an architectural feature of a structure involve less accurate approaches, such as counting stairs from ground level to the front door, or using tape measures or other measuring equipment to measure the height of the relevant feature above the nearby ground. Both the formal survey approach and the informal approaches are susceptible to human error, difficult to verify, and typically cannot be tested or verified without repeating the same procedures that are subject to error. The significant amounts of time needed to manually perform such measurements also severely impede efforts to assess risks in a timely manner, particularly when flood events may be experienced seasonally or within other time periods that make the widespread deployment of surveyors and other individuals to manually measure structures impractical. Manually surveying properties is difficult to scale and cannot be used to make real-time predictions for emergency management agencies, homeowners, and others who require up-to-date flood risk information for individual structures or properties.

To address these, and other technical challenges associated with accurately and efficiently determining the elevation and/or other position of an architectural feature of a structure in a given location, users associated with requests for the elevation and/or other position of architectural features of a structure in a given location may be able to interact with an elevation prediction system that uses a predictive, machine learning model. Through the use of a machine learning model, the system is able to identify, generate, and/or otherwise provide elevation and/or other position information regarding an architectural feature of a structure to a user based on the contextual information associated with the location at which the structure is located.

In assessing the predictive value of a model according to the embodiments herein, the inventors discovered that many of the most relevant variables were not publically available, including in flood-specific information repositories such as the Federal Emergency Management Agency's National Flood Insurance Program database. Embodiments of the systems, apparatus, and method discussed herein include techniques for capturing additional data for large geographic areas and generating new variables based on this supplemental data to generate a robust, predictive model. In some embodiments, this supplemental data may be based upon light detection and ranging (LiDAR) data sets from ranging signals and returns captured by survey vehicles covering large geographic areas (e.g., LiDAR survey aircraft). These survey data sets may be used to supplement and improve baseline data sets to facilitate accurate elevation predictions during modeling and generate broad geographic coverage relative to pre-existing databases and survey techniques. Moreover, the inventors developed several algorithms, discussed herein, for improving the predictive value of the LiDAR data sets.

In predicting the elevation and/or other position of an architectural feature of a structure at a given location, the system may draw from a range of information sources that can be supplied to the machine learning model. For example, the system may access and process information that provides context and/or other information about particular location, such as geographic coordinates for a given location, one or more light detection and ranging (LiDAR) data sets covering the location, land use data associated with the location, land coverage data associated with the location, relevant census data, and/or other publicly and/or privately available data sets associated with a given location, including but not limited to building permit information, parcel information held by a city, county, or other governmental entity, building code information, and/or the like. The system may also access and process information associated with additional locations that are different from the location that is the subject of a particular request. For example, in addition to and/or separately from any of the categories listed above, data acquired from an elevation certificate and/or other measurement of the elevation (or other position) of an architectural feature of another structure (such as one located nearby, for example) may be used. For example, optical character recognition (OCR) may allow intake of elevation certificate data into one or more of the data repositories discussed herein. The system may also access and process other information sources, such as historical event data, aggregated topographical and/or other geographic information, public records, other data sources, and the like for use in connection with the machine learning model. Consequently, through the use of known elevations and data describing aspects of a particular location, the elevation and/or other position of an architectural feature of a structure at a given location can be predicted without requiring the direct observation and/or measurement of the feature.

Many of the example implementations described herein are particularly advantageous in situations and other contexts that involve flood preparedness and planning. In some such situations, flood preparedness and planning may include assessing the risk to the persons and/or property associated with a given structure, and the presentation and/or offer to a user of information, resources and/or other services (such as insurance coverage, for example) that may allow a user to recover from and/or otherwise address the consequences of a flood. Likewise, implementations described herein may be used to identify structures having a particular flood risk to one or more finished floors and assist with pre-flood preparations as well as post-flood emergency response (e.g., via one or more renderable objects on a graphical user interface). By modeling the elevation and/or other position of architectural features of a structure at a particular location, the communications to the user may be rendered more effective and efficient, reach more individuals, and provide for the effective aggregation of data to assess risks on municipal, regional, and/or other scales to provide vital risk assessments and structural information to private and public officials. As such, and for purposes of clarity, some of the example implementations described herein use terms, background facts, and details that are associated with flood preparedness and planning and may reference the presentation of information and selectable data objects associated with insurance coverage. In some embodiments, the models and predictions described herein may also inform further improvements to the estimation process, such as narrowing the questions asked to a user to be more relevant to the important variables in the elevation calculation. Embodiments of the systems, apparatus, methods, models, and predictions discussed herein may also be used to generate automated quotes and automatically accept or reject risks via an agent API, while also generating a centralized database of property information and the properties' extended property attributes, flood risk attributes, elevation certificate attributes, and other attributes as described herein. In some embodiments, the present invention may include recursive improvement of an elevation database by storing model predictions for future recall and/or use in the prediction process. However, it will be appreciated that embodiments of the invention and example implementations thereof may be applicable and advantageous in a broad range of contexts and situations outside of those related to event preparedness and planning.

The elevation drawing presented in FIG. 5 illustrates many of the technical challenges overcome by embodiments of the invention and other aspects of the invention. FIG. 5 depicts a structure 500 (shown as a home) located on a parcel of land 502. As discussed herein, the inventors have recognized that in situations where the water level during a flood event exceeds the level of the first finished floor of the structure 500, which is shown at point 504, the risk to persons and property at the structure 500 increases significantly. The risks to persons and property may also be impacted the materials and configurations used for the foundation, shown at element 506, and the structural elements 508 that are underneath the point 504 marking the first finished floor. Under conventional approaches, the elevation of point 504 above the level of the parcel of land 502 (or another frame of reference, such a sea level, for example) must be directly measured, either through a survey or through other, less reliable techniques.

As discussed herein, instead of requiring the elevation position of point 504 (which corresponds to the first finished floor of the structure 500) to be directly measured, example implementations of embodiments of the invention use a model to predict the elevation position of point 504 based on one or more location context data objects. For example, the model may take into account LiDAR and/or other topographical data, an example of which is shown in FIG. 6. In some other example implementations, a land use data set may be used by the model. Such a data set may include information obtained from public and/or private records, such as building permit information, architectural plans that describe details of the structure 500, such as the materials and configurations used for the foundation 506 and the structural elements 508 that are underneath the point 504 marking the first finished floor.

In some example implementations, the model may take into account land use data, which may include public and/or privately available data describing how the parcel of land 502 and/or the surrounding area is used. In the context of FIG. 5, such land use data may indicate that the parcel of land 502 is designated for residential use, and may also include information about infrastructure present on or near the parcel of land 502, such as drainage pipes, storm water management ponds, or the like. In some example implementations, the model may take into account land coverage information, which may include data describing the prevalence of trees, structures, and/or other fixtures on the parcel of land 502 that extend above the level of the ground, such that the accuracy of LiDAR data and/or other topographical data measured from above the parcel of land 502 may be impacted. In other example implementations, the model may take into account census data, such as information about the individuals who live and/or otherwise use the structure 500, and may be imperiled or impacted by a flood event.

In some example implementations, the model may take into account location context information associated with other structures at other locations. In many locations, builders tend to use a limited set of plans when building homes, commercial spaces, and/or otherwise developing the larger area. As such, while measured and verified information regarding the elevation of position 504 may not exist with respect to the structure 500, such measured and verified elevation information may exist for a second structure in a second location that closely matches the plans used for the structure 500. In such a situation, the existing measured and verified elevation of the first finished floor of the second structure may be highly relevant to a prediction of the first finished floor of the structure 500. In another example situation, measured elevations for the buildings adjacent to the structure 500 (such as other homes in the neighborhood) may indicate that the first finished floor of a home in a given area is typically at least five feet (or some other height) above the surrounding ground. In such a situation, the measured elevation information for the nearby homes may be relevant to a prediction of the elevation of the point 504 on structure 500.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user", "client", and/or "request source" refer to an individual or entity that is a source, and/or is associated with sources, of a request for the elevation of an architectural feature of a structure and/or related content to be provided by an elevation prediction control system and/or any other system capable of predicting the elevation and/or other position of an architectural feature of a structure and providing messages and/or related content to the individual and/or entity. For example, a user and/or client may be the owner and/or entity that seeks information and options associated with preparing and/or otherwise planning for one or more potential flood events and/or may be an entity responsible for assessing and/or valuing the risk posed to persons and/or property associated with the structure by potential flood events.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "digital content item" refers to any electronic media content item that is intended to be used in either an electronic form or as printed output and which may be received, processed, and/or otherwise accessible by a client device. A digital content item, for example, may be in the form of a text file conveying human-readable information to a user of a client device. Other digital content items include images, audio files, video files, text files, and the like.

The term "event" refers to any discernible action, instance, or occurrence. For example, an event may consist of a flood, a storm, other major weather instance, natural disaster, infrastructure failure, property damage, destruction, injury, and/or other casualty. It will be appreciated that an event may be attributable to and/or the result of action by one or more individuals and/or entities, or may not be so attributable (such as in the case of natural and/or unexplained phenomena, for example).

As used herein, the term "data object" refers to a structured arrangement of data. As described herein, example implementations of embodiments of the invention make reference to several particular data objects:

A "message request data object" is a data object that includes one or more sets of data associated with a request by a user for the elevation and/or other position of an architectural feature of a structure and/or a message and/or other digital content items related to the requested elevation or position. When conveyed from a user or other requester associated with a request source system to an elevation prediction system, a message request data object contains at least an identification of a structure, such as an address or geographic coordinates, for example. In some example implementations, a message request data object may further identify the particular architectural feature for which an elevation is requested.

A "location context data object" is a data object that includes one or more sets of data that alone or in combination provide information about a context in which a particular location (such as a geographic location at which a structure is present, for example) may be placed. When conveyed from a context content system to an elevation prediction system, and location context data object contains at least an indication of a geographic location or area relevant to the location at which a structure that is the subject of a request is located. In some example implementations, a location context data object further contains LiDAR data or other topographical data. In some example implementations, a location context data object contains information extracted from an elevation certificate developed for a location other than the location at which the structure that is the subject of a request is located.

As used herein, the term "data set" refers to a collection of data. One or more data sets may be combined, incorporated into, and/or otherwise structured as a data object. In the example implementations of embodiments described herein, multiple different data sets are referenced and described.

As used herein, a "location identification data set" is a data set that includes one or more indications of a geographic location. In some example implementations, a location identification set includes geographic coordinates, a street address, and/or another location identification.

As used herein, a "predicted feature elevation position data set" is a data set that contains one or more indications of the elevation position of an architectural feature of a structure. In some example implementations, a predicted feature elevation position set includes a height measurement above sea level at which the architectural feature of the structure is located. In some example implementations, the predicted feature elevation position set includes a height measurement above the adjacent ground level at which the architectural feature of the structure is located. In some example implementations, the predicted feature elevation position includes a height measurement identifying the vertical distance between the architectural feature of the structure and a reference point.

As used herein, a "land use data set" is a data set that contains information identifying how an area of land at a particular location is used and/or authorized to be used. In some example implementations, a land use data set includes data derived from zoning records maintained by a governmental agency and/or other entity responsible for setting regulations on the use of one or more areas of land. For example, a land use data set may identify that a parcel of land is zoned for residential, commercial, industrial, and/or another use. In some example implementation, a land use data set may include information describing how a parcel of land and/or a portion of a parcel of land is used, such as an identification of buildings, roads, wires, pipes, other infrastructure, and/or the activities performed on the land.

As used herein, a "land coverage data set" is a data set that contains information identifying the portions of a parcel of land that are covered structures, fixtures, trees, other plants, and/or other items that extend above the surface of the underlying ground.

As used herein, a "census data set" is a set of information incorporating and/or derived from a census. In some example implementations, a census data set identifies the number of people living on and/or near a parcel of land. In some example implementations, a census data set may include additional information about the individual and/or individuals living on and/or near a parcel of land, such as the ages, occupations, education level, and/or other biographical information.

As used herein, a "model" refers to a computational model capable of receiving inputs in the form of one or more data objects and/or data sets, and automatically performing calculations and/or other computing operations to generate an output. In some example implementations, a model will incorporate artificial intelligence capabilities and/or other machine learning capabilities, such that the model may be trained by applying inputs known to be associated with a given result, and adjusting the model to cause the automatic operations performed by the model to achieve the results expected from the training data. Some example implementations of embodiments described herein reference and describe the use of a geospatial machine learning model, which is a model that is configured to receive one or more location context data objects as input and, based on the data extracted from such location context data object, identify a position in three-dimensional space with respect to a geographic frame of reference. A geospatial machine learning model is a machine learning model, at least in the sense that the geospatial machine learning model may be trained to improve its ability to achieve an accurate calculation of the elevation position of an architectural feature based one or more location context data objects that do not explicitly provide the elevation position of the architectural feature.

As used herein, the term "identification of an elevation position" is a measured elevation position, such as a measured height of a first finished floor above the adjacent ground level. In some example implementations, an identification of an elevation position is a measurement extracted from an elevation certificate and/or a directly measured elevation, such as a measurement performed by a surveyor. As used herein, a "predicted elevation position" is a calculated prediction of an elevation position, such as predicted height of the first finished floor of a structure above the adjacent ground level. As described in connection with example implementations of embodiments herein, a predicted elevation position may be calculated by a geospatial machine learning model based on one or more location context data objects.

As used herein, the term "authenticated indication of the identity of a user" refers to an indication that a user has presented credentials and/or other information confirming that the user is authorized to use one or more system components. In some example implementations, an authenticated indication of the identity of a user may include an indication that a user has successfully entered a username and password, presented an authentication token, supplied additional information confirming the identity of the user, or otherwise confirmed their identity.

Example System Environment

Turning now to the Figures, FIG. 1 shows an example system environment 100 in which implementations involving the efficient prediction of the elevation and/or other position of an architectural feature of a structure may be realized. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1 and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the prediction of the elevation and/or other position of an architectural feature of a structure by receiving and parsing a message request data object received from a user, retrieving and/or receiving a set of data objects and/or other data sets to be presented to a machine learning model (such as one or more location context data objects, for example), retrieving a predicted feature elevation position data set by applying the received data objects to a machine learning model, and generating a control signal causing a renderable object associated with the predicted feature elevation position data set to be displayed on a user interface of a client device associated with the user. Some such implementations contemplate the use of location context data objects and/or other data sets associated with locations other than the location associated with the structure that is the subject of a given message request data object. Some such embodiments leverage a hardware and software arrangement or environment for the feature elevation prediction and responsive message generation actions described, contemplated, and/or otherwise disclosed herein.

As shown in FIG. 1, an elevation prediction system 102 includes an online an elevation prediction system module 102A which is configured to receive, process, transform, transmit, communicate with, and evaluate message request data objects, location context data objects, the content and other information associated with such data objects, other data sets, and related interfaces via a web server, such as elevation prediction system server 102B and/or elevation prediction system device 102D. The elevation prediction system server 102B and/or elevation prediction system device 102D is connected to any of a number of public and/or private networks, including but not limited to the Internet, the public telephone network, and/or networks associated with particular communication systems or protocols, and may include at least one memory for storing at least application and communication programs.

It will be appreciated that all of the components shown in FIG. 1 may be configured to communicate over any wired or wireless communication network, including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMAX network, as well as a public network, such as the Internet, a private network, such as an intranet, or combinations thereof, and any networking protocols now available or later developed including, but not limited to, TCP/IP based networking protocols may be used in connection with system environment 100 and embodiments of the invention that may be implemented therein or participate therein.

As shown in FIG. 1, elevation prediction system 102 also includes an elevation prediction database 102C that may be used to store information associated with message request data objects, users and/or locations associated with message request data objects, location context data objects, other data sets, interfaces associated with any such data objects or data sets, request source systems, context content systems, and/or any other information related to the prediction of the elevation and/or other position of an architectural feature of a structure and the generation of one or more related messages and/or digital content item sets. The elevation prediction database 102C may be accessed by the elevation prediction system module 102A, the elevation prediction system server 102B, and/or the elevation prediction system device 102D, and may be used to store any additional information accessed by and/or otherwise associated with the elevation prediction system 102 and/or its component parts. While FIG. 1 depicts elevation prediction system database 102C as a single structure, it will be appreciated that elevation prediction system database 102C may additionally or alternatively be implemented to allow for storage in a distributed fashion and/or at facilities that are physically remote from the each other and/or the other components of elevation prediction system 102.

Elevation prediction system 102 is also shown as including elevation prediction system device 102D which may take the form of a laptop computer, desktop computer, or mobile device, for example, to provide an additional means (other than via a user interface of the elevation prediction system server 102B) to interface with the other components of elevation prediction system 102 and/or other components shown in or otherwise contemplated by system environment 100.

Message request data objects, message request data object information and/or additional content or other information to be associated with one or more message request data objects may originate from a request source system such as request source system 104. A user of request source system 104 may use a request source device 104B, such as a laptop computer, desktop computer, or mobile device, for example, to interface with a request source module 104A to create, generate, and/or convey a request message data object and/or information to be included in a message request data object, such as a location identification data set and/or another request data set. The request source system 104 may (such as through the operation of the request source module 104A and/or the request source device 104B, for example) transmit a message request data object to the elevation prediction system 102. While only one request source system 104 is depicted in FIG. 1 in the interest of clarity, it will be appreciated that numerous other such systems may be present in system environment 100, permitting numerous users and/or other request sources to develop and transmit message request data object and/or information associated with message request data objects to elevation prediction system 102.

As shown in FIG. 1, system environment 100 also includes context content system 106, which comprises a context content module 106A, a context content server 106B, and a context content system database 106C. While only one context content system 106 is depicted in FIG. 1 in the interest of clarity, it will be appreciated that numerous additional such systems may be present in system environment 100, permitting numerous sources of location context content to communicate and/or otherwise interact with the elevation prediction system 102 and/or one or more request source systems 104. As shown in FIG. 1, the context content system 106 is capable of communicating with elevation prediction system 102 to provide information that the elevation prediction system 102 may need when predicting the elevation and/or other position of an architectural feature of a structure at a given location. For example, context content system 106 may, such as via the capabilities and/or actions of the context content module 106A, context content system server 106B, and/or context content system 106C, obtain and provide information associated with a location, such as LiDAR data, other topographic and/or geographic data, land use data, land coverage data, census data, recorded observations and/or other measurements, and/or other location-related data, for example. In some instances the information associated with a location may include one or more elevation certificates (and/or data scraped, extracted, and/or otherwise acquired from one or more elevation certificates) that have been obtained for the location and/or one or more other locations and may include other measurements or observations made with respect to one or more other locations.

Context content system 106 is also shown as optionally being capable of communicating with request source system 104. In some situations, such as when a given context content system 106 is associated with content owned by and/or otherwise controlled by a user of a request source system, it may be advantageous for the context content system 106 to interface with and/or otherwise be in communication with the request source system 104 in general and the request source device 104B in particular to capture and/or otherwise process such content.

With continued reference to FIG. 1, system environment 100 may further include location survey system 108, which may include a survey vehicle 108a (e.g., a plane) including at least one sensor 108b in electrical communication with a computing apparatus 108c, which may comprise a processor, memory, input/output circuitry, and communications circuitry as shown with respect to the apparatus 200 of FIG. 2. In some embodiments, the at least one sensor 108b may comprise a transmitter and a receiver respectively configured to transmit ranging signals 108d (e.g., electromagnetic signals) and receive returns from a reflection of the ranging signals to generate one or more ranging data objects related to one or more scanned objects 110 (e.g., buildings) based on the returns. The computing apparatus 108c of the survey vehicle 108a may then communicate with at least one of the context content system 106 and the elevation prediction system 102 to provide the one or more ranging data objects to be incorporated into the location context data objects as described herein. In some embodiments, one or more intermediate computing devices may transmit and/or perform intermediate processing steps on the ranging data objects prior to use by the context content system 106 and/or elevation prediction system 102. In some embodiments, the one or more ranging data objects may include geometric data related to one or more dimensions of the scanned objects, and the one or more ranging data objects may include a geographic location data object associated with the geometric data (e.g., geographic coordinates at which the data was captured) and/or dynamic vehicle data objects (e.g., altitude). The ranging data objects may include point clouds of elevation data assigned to geographic coordinates. In some embodiments, the ranging data objects may be supplement one or more other data sources (e.g., location context data objects) to create a robust data model capable of facilitating generation of an accurate model as discussed herein. In some embodiments, the ranging data may be used to calculate new location context data objects including lowest adjacent grade (LAG) and highest adjacent grade (HAG) data objects. As used herein in some embodiments, LAG may refer to the lowest grade adjacent to a structure and HAG may refer to the highest grade adjacent to a structure. As used herein "adjacent" may refer either to areas directly abutting a structure, or to areas within a predetermined distance of a structure or reference point (e.g., a 35 foot or 50 foot diameter may be chosen).

As depicted in FIG. 1, the at least one sensor 108b may scan the objects 110 (e.g., buildings) by transmitting the ranging signals 108d (e.g., electromagnetic signals) towards the objects with a transmitter and receiving returns from the reflections of the ranging signals off the objects. The transmitter and receiver may be a single sensor (e.g., a transceiver module) or multiple sensors (e.g., one or more separate transmitter/receiver pairs). In some embodiments, the sensors 108b may comprise LiDAR sensors configured to generate LiDAR data sets, such as the topographical map shown in FIG. 6, as described herein. In an example embodiment, the LiDAR sensors may comprise a laser configured to transmit ranging signals as pulses of laser light and a receiver sensor (e.g., a camera) configured to detect the laser returns from the pulses of laser light striking the object. The computing apparatus 108c may calculate and/or store ranging data objects, which may include a time between transmission of the laser pulses and receipt of the laser returns and/or a computed range to the object, which may be derived therefrom based upon the speed of light.

In some embodiments, the survey vehicle 108a may comprise an airplane having onboard LiDAR surveying equipment configured to scan the ground and structures 110 below with fan-shaped ranging signals 108d. The survey vehicle 108a may capture ranging data objects across a large geographic area with sequential passes over a predetermined flight path. Ranging data objects may be requested via a ranging data request data object, which may specify one or more geographic locations for which ranging data objects are requested.

Overall, and as depicted in system environment 100, elevation prediction system 102 engages in machine-to-machine communication with request source system 104, context content system 106, and location survey system 108 via one or more networks, to facilitate the processing of message request data objects received from a user, the prediction of the elevation and/or position of an architectural feature of a structure, the retrieval and/or generation of a digital content item set and/or other data set based at least in part on the message request data object at the predicted elevation, and the generation and/or transmission of a control signal causing a renderable object associated with the predicted elevation (or other position) to be displayed on a user interface of a client device associated with the user.

Example Apparatus for Implementing Embodiments of the Present Invention

It will be appreciated that the elevation prediction system 102 may be embodied by one or more computing systems, such as apparatus 200 shown in FIG. 2. As illustrated in FIG. 2, the apparatus 200 may include a processor 202, a memory 204, input/output circuitry 206, communications circuitry 208, elevation prediction circuitry 210, and/or context content circuitry 212. In some embodiments, the context content system 106 and/or location survey system 108 may comprise one or more computing systems, such as apparatus 200. The apparatus 200 may be configured to execute any of the operations described herein, including but not limited to those described in connection with FIG. 1, FIG. 3, and FIG. 4.

Regardless of the manner in which the apparatus 200 is embodied, the apparatus of an example embodiment is configured to include or otherwise be in communication with a processor 202 and a memory device 204 and optionally the input/output circuitry 206 and/or a communications circuitry 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories.

In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include input/output circuitry 206, such as a user interface that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication circuitry 208. The communication circuitry 208 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As shown in FIG. 2, the apparatus may also include elevation prediction circuitry 210. The elevation prediction circuitry 210 includes hardware configured to maintain, manage, and provide access to a predictive model and/or information used by the predictive model to determine a predicted elevation and/or other position of an architectural feature of a structure. The elevation prediction circuitry 210 may provide an interface, such as an application programming interface (API), which allows other components of a system to obtain information associated with one or more locations and/or information associated with the likely elevation and/or position of a feature of a structure at a location. For example, the elevation prediction circuitry 210 may facilitate access to and/or processing of information regarding a structure, its features, the surrounding geography, and/or other information that may be used to predict the elevation and/or other position of an architectural feature of a structure, including but not limited to any of the information that may be obtainable from and/or otherwise associated with a context content system 106.

The elevation prediction circuitry 210 may facilitate access to the location context information and/or other information used by the predictive model through the use of applications or APIs executed using a processor, such as the processor 202. However, it should also be appreciated that, in some embodiments, the elevation prediction circuitry 210 may include a separate processor, specially configured field programmable gate array (FPGA), or application specific interface circuit (ASIC) to manage the access and use of the relevant data. The categorization circuitry 210 may also provide interfaces allowing other components of the system to add or delete records to the event prediction system database 102C, and may also provide for communication with other components of the system and/or external systems via a network interface provided by the communications circuitry 208. The elevation prediction circuitry 210 may therefore be implemented using hardware components of the apparatus configured by either hardware or software for implementing these planned functions.

The context content circuitry 212 includes hardware configured to manage, store, process, and analyze a location context data object, as well as the data sets and other information that may contained in and/or used to generate a location context data object. Because the information that may be accessed and used to create location context data objects may change frequently and/or be subject to control by other systems, it may be desirable to maintain a context content database separate from elevation prediction database 102C and/or the memory 204 described above. It should also be appreciated though, that in some embodiments the elevation prediction circuitry 210 and the context content circuitry 212 may have similar and/or overlapping functionality. For example, both the elevation prediction circuitry 210 and the context content circuitry 212 may interact with one or more data objects associated with the context within which a particular structure resides. The context content circuitry 212 may also provide access to other historical information, such as prior information sets presented to users with respect to a given structure and/or location.

Example Processes for Architectural Feature Elevation Prediction

FIG. 3 is a block diagram showing an example data flow 300 that may be used in connection with the prediction of the elevation and/or other position of an architectural feature of structure at a given location. As shown in FIG. 3, a feature position prediction manager 302 is configured to receive a message request data object from a user via a user request object interface 304. The user request object interface 304 may be implemented as a discrete interface capable of passing message request data objects to the feature position prediction manager 302 and/or may be incorporated into an elevation prediction system 102, an implementation of the apparatus 200, and/or another system component. It will be appreciated that the precise implementation of the user request object interface 304 and its interactions with the feature position prediction manager 302 will vary depending on the particulars of the situation, context, and system environment in which users convey message requests to such elements.

In some example implementations, upon receipt of a message request data object via the user request object interface 304, the feature position prediction manager 302 may extract from the received message request data object a location identification data set. The location identification data set is associated with a first location, typically the location at which a structure for which the elevation of a particular feature is requested. In some example implementations, the location identification data set includes a geographic coordinates set, which may include geographic coordinates that define the location of an architectural feature of a structure. In other example implementations, other location identifiers, such as a street address, plot number, and/or other geographic identification data may be incorporated into the location identification data set. In some embodiments, the user request object interface 304 may further transmit at least some location context data objects, such as initial questionnaire responses from a user regarding foundation type, number of steps, or other data that might be available to the user.

In some example implementations, the location identification data set and/or the message request data object may include information that can be used by the feature position prediction manager 302 and/or another system element to identify a particular user. For example, such identification information may include an authenticated indication of the identity of a user such as confirmed user name and/or unique identification number that has been previously associated with a particular user.

The feature position prediction manager 302 is also configured to take as inputs one or more data sets that may be extracted from one or more location context data objects. In some example implementations, a location context data object may include data sets that originate from a wide variety of sources, which may be combined into structured data objects that can be stored based on the location related to the data. In other example implementations, one or more data objects may be structured by the type of location context data stored and/or otherwise structured within the data object. Regardless of the specific structuring of location context data and the operation of any intervening components, the feature position prediction manager 302 is shown as receiving (directly or indirectly) location context data from one or more repositories.

One such repository from which the feature position prediction manager 302 may receive location context data is elevation certificate repository 306. In some example implementations, the feature position prediction manager 302 may be associated with (or otherwise have access to) a repository of information scraped, extracted, and/or otherwise acquired from one or more elevation certificates and/or other direct measurements of the elevation and/or other position of an architectural feature of a structure at a location. In some instances, a previously-prepared elevation certificate may exist for the location that is the subject of a particular user request. In such instances, the existing elevation certificate may provide a strong indication of the likely elevation of the feature of the structure reflected in the user request. In more typical instances, however the information acquired from the elevation certificate repository 306 will reflect the elevation of features of other structures that may be relevant to the elevation of the structure identified in a particular request. For example, the elevation certificate repository 306 may provide elevation information about structures that are near to a particular structure and/or exhibit similar architectural, geographic and/or other features to that of the structure identified in a particular request. In some embodiments, the elevation certificate repository 306 includes data for at least a portion of the geographic locations in a region, which may be used to generate information about other geographic locations in the area and/or other geographic areas sharing a similar context data. For example, an elevation certificate may include flood zone information, building elevation information, and lowest floor information, which may be read (e.g., via OCR) from the certificate into the repository.

Another repository from which the feature position prediction manager 302 may receive location context data is LiDAR data repository 308, which may contain data sets such as the ranging data objects generated and described with respect to the location survey system 108 shown in FIG. 1. In many locations, LiDAR technology is used to develop and maintain ground-level elevation and other topographical data describing the terrain of a given area. In some such areas, as well as in areas where LiDAR data may be unavailable, ground-level elevation data may be derived and/or otherwise obtained through the use of a digital elevation model, an elevation contour model, and/or from systems that use such models. For example, the United States Geological Survey makes available ground-level elevation data that incorporates digital elevation models and other data sources. Such LiDAR-derived data (and/or other ground-level elevation information, for example) can be stored in LiDAR data repository 308 and accessed by the feature position prediction manager 302. In some embodiments, the apparatus and systems herein, such as the feature position prediction manager 302, may be configured to generate one or more additional data objects for training of a model and generating predictions based thereon (e.g., LAG or HAG values). In some instances, such as situations where the elevation of an architectural feature is known (such as through the existence of an elevation certificate and/or other confirmed measurement of the feature), data received from LiDAR data repository 308 can be used in connection with training a model used by feature position prediction manager 302 to identify statistical and/or other correlations between ground-level elevation data and the likely elevation of the relevant architectural features of structures. In some embodiments in which the ground elevation adjacent to a structure is known independent of the LiDAR data set, the independent data set and the LiDAR data set may be compared and, if the data sets are different by a threshold value or more, one or both of the data sets may be discarded. In one such embodiment, the LiDAR data set may be discarded.

FIG. 6 depicts a map of a geographic area 600 for which topographical data has been gathered using LiDAR technology. As shown in FIG. 6, the elevation of a structure 602 can be shown in relationship the topography of the surrounding geographic area 600. Depending on the capabilities of the LiDAR system used to acquire the elevation data, the data points derived from the LiDAR system can be output as a spreadsheet and/or other data file, and/or used to render a map, such as the map shown in FIG. 6. In FIG. 6, one or more elevation contours (shown as contours 604A, 604B, and 604N, are used to mark regions of land featuring similar elevations, such that a comparison of the elevation of the ground where structure 602 is located to the surrounding land can be performed visually. In situations where the LiDAR data used to generate the map in FIG. 6 is scaled, normalized, and/or otherwise presented to a geospatial machine learning model and/or other similar model, the LiDAR data may be highly relevant in ascertaining the elevation of a first finished floor and/or other architectural features of structure, and the risks associated with a flood event at that location.

The feature position prediction manager 302 is also shown in FIG. 3 as being configured to take as inputs data objects from a wide range of data repositories 310A-310N. In general, these data repositories are configured to provide data objects and/or data sets to the feature position prediction manager 302 that provide information that may be used to predict the elevations or other position of one or more architectural features of a structure. In some example implementations, each of the data repositories 310A-310N may be implemented in connection with and/or otherwise incorporated into one or more context content systems 106. However, it will be appreciated that any other approach to providing a data repository that may be accessed by a feature position prediction manager 302 and/or a related system (such as an elevation prediction system 102, for example) may be used in connection with example implementations of data flow 300. In some embodiments discussed herein, the feature position prediction manager 302 may supplement one or more location context data objects derived from the data repositories 310A-310N with ranging data objects and/or new data objects to generate a more robust data model for training a machine learning model.

As shown in FIG. 3, data repository 310A is a population data repository. In some example implementations, population data repository 310 is configured to and otherwise capable of providing a location context data object to the feature position prediction manager 302. Data repository 310B is shown in FIG. 3 to be a land use data repository, and may be configured to and otherwise capable of providing a location context data object to the feature position prediction manager 302. Data repository 310C is shown in FIG. 3 to be a land coverage data repository, and may be configured to and otherwise capable of providing a location context data object to the feature position prediction manager 302. Data repository 301D is shown in FIG. 3 to be a property characteristic data repository, which may, for example include information derived from building permits, architectural plans, and/or other sources of information to describe the aspects of the structure that may be present at a given location. It will be appreciated the labels and aspects of the data repositories 310A-310N may vary in example implementations based on the types of data available for use in connection with predicting an elevation and/or other position of an architectural feature of a structure.

In some embodiments, the data sources discussed herein may be processed or pre-processed to generate an initial data model and facilitate implementation of the machine learning model in the feature position prediction manager 302. This processing may include cleaning and integrating data from various, disparate sources (e.g., data repositories 306, 308, 310A-310N and LiDAR) to be used in accordance with the embodiments discussed herein as a cohesive data model to train and implement a prediction model (e.g., at the feature position prediction manager 302). In some embodiments, a prediction model may be generated for a geographic area, such as a country, state, county, city, zip code, or other denomination. In an example embodiment, a prediction model (e.g., a machine learning model) may be generated to predict the elevation of an architectural feature of structures in the United States. With reference to FIG. 7, an example data preprocessing flow 700 is shown, which includes various optional preprocessing stages 710, 720, 730, 740. In the depicted embodiment, at block 710, the first preprocessing stage includes integrating the data sets in the data repositories selected for modeling using a custom key to create a combined dataset of the selected repositories. For example, the custom key may be a reference number or identifier assigned to a particular geographic location or address to link the data between two or more training data sets. For example, multiple data repositories may be linked by assigning a custom identifier per location.

In the depicted embodiment, at block 720, the second preprocessing stage includes reducing the integrated and combined dataset via one or more steps. For example, at block 722 redundant entries (e.g., redundant properties or redundant features associated with each property) are removed. At block 724, the most recently active record is queried, allowing removal of outdated data. In some embodiments, at block 730, supplemental, more trustworthy, and/or more current data sources may be inserted after the second preprocessing stage. For example, LiDAR data sets may be added to the combined, integrated, and reduced dataset after step 720. In the depicted embodiment, at block 740, the third preprocessing stage may include finalizing the data set for use by the model or other algorithm of the feature position prediction manager 302.

The final data preprocessing steps may include feature engineering and selection. The feature engineering may include two steps, which may include (1) if a variable is missing data, applying a missing value imputation calculation described above, and if the missing value imputation rules do not satisfy the variable definition requirements, creating a new variable; and (2) create new variables and features to address high cardinality dimensions, map values to binary indicators, and converting variables to ordinal (e.g., label encoding). At block 742, missing data may be imputed for any existing variables in the combined data set. For example, if one or more data fields for a given variable are blank, the field may be filled with either a placeholder value or its value may be calculated based on the surrounding data (e.g., an average of nearby data points). In some embodiments, a sentinel value may be set for which the data indicates that the field has no applicable data (e.g., "UNKNOWN" or "9999"). For machine learning models, it may be necessary for each field to be complete (e.g., no null values) to allow processing by the model even if such values must be imputed.

At block 744, new variables may be created from existing variables. The new variables may be used to fill gaps in the existing data set and/or supplement the existing data set. Such new variables may be interpolated based on adjacent data points (e.g., data from adjacent houses may imply data about a third house adjacent to the first two). In some embodiments, a subset of the combined, integrated, and reduced data set may be averaged to generate new variables for similar geographic locations for which data is unavailable (e.g., an average value for a geographical topology, city, region, county, zip code, etc. may be used). In some embodiments, with continued reference to block 744, feature engineering may be employed to create new features from the existing raw features in the processed data set to gain information about the relationships between the variables and the target. In an example application of feature engineering for missing data, if a base flood elevation value is missing from a property, the value may be initially set at 9999.

In an example application of feature engineering for a new variable, if previous repository data for lowest adjacent grade (LAG) of a geographic location stored in a non-LiDAR repository is set to 9999, a new variable for LiDAR LAG may be introduced that incorporates the LiDAR data from the LiDAR data repository 308 in place of the default/missing "9999" value. LiDAR data may be used to supplement gaps in the existing elevation data for a geographic location. In another example, the inventors noted that certain elevation values may be more prevalent than others. For example, an elevation from an address to the nearest water body may be more common than base flood elevation, and in some embodiments, the former may be used as a proxy for the missing elevation data. This new variable generation may be stored in a keys table to allow back tracing of the modified LAG value.

The ranging data objects (e.g., LiDAR data) may be used to generate new variables that correlate more highly to the target variable (e.g., elevation of an architectural feature of a structure). Embodiments of the present invention may include calculating one or more new data objects from the ranging data objects. With reference to FIG. 13, an example process 1300 for computing one or more new data objects is shown. The depicted process may include receiving the ranging data objects 1305, which may include one or more elevation data points associated with one or more geographic locations. An optional pre-processing stage 1310 may comprise computing the elevation data points from raw return signals in the ranging data objects. For example, the ranging data objects may include time of flight (TOF) data for the signals comprising a time from transmission of the signals to receipt of the returns. The pre-processing may comprise calculating a distance traveled from the TOF data based on a known speed of the signals. The distance traveled may then be compared with the dynamic vehicle data objects (e.g., altitude of the vehicle, angle of the returns) to determine the actual elevation of each return and may be associated with a geographic location for each elevation data point. After the optional pre-processing, the ranging data objects may include elevation data objects associated with a plurality of geographic locations. At step 1315, the ranging data objects may undergo further processing to determine the one or more new data objects. In an example embodiment, the new data objects may be determined by receiving property data 1320, which may geographically locate one or more properties (e.g., identifying plots or regions as distinct properties). The property data 1320 may correspond to the custom key described above, whereby the one or more new data objects may be associated with a pre-existing property that has been assigned a custom key. At step 1325, radius data may be received defining a radius or diameter from a given geographic location for which to determine the new data objects. Based on the property data 1320 and the radius data 1325, the ranging data objects may be partitioned into geographic regions associated with each property at step 1330. For example, a neighborhood of single-family homes may comprise one new geographic region defined by a coordinate location of the home and a diameter of the region relative to a point at the home. The partitioned ranging data objects 1330 may then be used to determine the new data objects for each partition, which may then be associated with the custom key and integrated into the data repositories described herein. For example, in some embodiments, LAG and HAG data are important features for the predictive model, as described elsewhere herein; however, these values may be missing from one or more preexisting data repositories for at least some geographic locations. Using a process such as the one identified above and described with respect to FIG. 13, a point cloud of ranging data objects may be partitioned into properties (e.g., geographic regions) having a radius or diameter relative to a geographic location. In some embodiments, the coordinate location from which the radius is taken may be the centroid of the property (e.g., the diameter intersects the centroid). In some embodiments, a user may identify the desired geographic location on the property from which the radius is taken. In some embodiments, the coordinate location associated with the property in the preexisting dataset (e.g., the coordinates associated with each custom key) may be input into the LiDAR LAG/HAG calculation as the initial geographic location from which the geographic region is determined. Within the region, the highest point may be stored as the HAG value and the lowest point may be stored as the LAG value. The LiDAR HAG and/or LAG values may then be added to the total dataset for training a model to create predictions for both geographic locations for which LiDAR data is available and for geographic locations for which LiDAR data is not available.

In some embodiments, creating new data objects may comprise creating aggregate or combination data objects that include data from multiple data objects including one or more new data objects. For example, a NEW LAG value may be created that combines a LAG data object from a data repository (e.g., from information on elevation certificates) and a LiDAR LAG data object (e.g., calculated from the LiDAR data). When combining the data sets, if either value is null or a sentinel placeholder value, only the non-null/sentinel value will be used (e.g., if the elevation certificate LAG is 9999, the value may be set to the LiDAR LAG value). Moreover, if the combined data points disagree by more than a predetermined threshold, one or both of the data points may be discarded. For example, if the difference between the elevation certificate LAG and the calculated LiDAR LAG is 20 or greater, the LiDAR LAG may be discarded and only the elevation certificate LAG value may be used. Similar combinations and calculations may be performed for any of the data objects.

Other examples of new data objects that may be generated for training the model include, but are not limited to, the type of structure (e.g., mobile home, single family home, multi-family home, commercial, etc.); LAG and HAG data averaged at a zip code, city, county, state, etc. level; averages of known lowest floor elevation (LFE) values for geographic areas (e.g., zip code, city, county, state, country, etc.); or other combinations of the data values and properties discussed herein. In some embodiments, the one or more new data objects may be created via mean encoding across predefined geographic areas. For example, known data points (e.g., LFE) for properties in a predefined area (e.g., zip code, city, county, state, country, etc.) may be averaged and assigned to properties missing such values within the same predefined area. Similarly, areas for which no LiDAR data has yet been captured may use mean encoded LiDAR data from surrounding areas in place of the LiDAR data to perform the model generation and calculations (e.g., LAG/HAG calculation) described herein.

At block 746, variables with less importance (e.g., a lower effect on the predictions in the model) may be removed from the data set. For example, in some embodiments, feature selection may be used to reduce the number of key features that will be used for developing and implementing the model. The feature selection may include removing unnecessary features (e.g., various date data sets, FIPS codes, map names, etc.) and other identifying information unrelated to the predictive variables. In some embodiments, feature selection may include removing portions of the data set that do not have a significant correlation with the target variable (e.g., the predicted feature elevation position data set). In some embodiments, feature selection may include removing highly multi-correlated variables, and may include selecting the variables with the highest importance. For example, in one instance, the instant inventors reduced the data features from 324 to 227, allowing simplification and strength of the model generation and predictions. The identified key variables may also be used to modify an initial questionnaire asked to new users to better target the important variables influencing the elevation prediction when transmitting an initial message request data object. In some embodiments, a threshold value may be set for removing less important variables, such that any variable below the threshold is excluded. In some embodiments, a cumulative value may be used such that a top number of variables are included (e.g., a top 30).

With reference to FIG. 3, in some example implementations of data flow 300, the feature position prediction manager 302 may employ machine learning or a trainable model such that, over time, the feature position prediction manager 302, through receiving a plurality of user confirmations, may improve the determination of a prediction of the elevation and/or other position of an architectural feature of a structure in a particular location, and otherwise responds to a request received from the user in a manner that incorporates and/or is informed by the predicted feature elevation and/or position.

In some such embodiments, feature position prediction manager 302 may employ machine learning, or equivalent technology to improve future determinations of the elevation and/or other position of an architectural feature of a structure. In some examples, feature position prediction manager 302 may generally provide a trained model that is given a set of input features, and is configured to provide an output of a score (such as a reliability score, for example), a recommendation, or the like. In some embodiments, a trained model can be generated using supervised learning or unsupervised learning. In some examples, such learning can occur offline, in a system startup phase, or could occur in real-time or near real-time during performing the methods shown in the described figures (e.g., predicting an elevation or position of an architectural feature of a structure). The trained model may comprise the results of clustering algorithms, classifiers, neural networks, ensemble of trees in that the trained model is configured or otherwise trained to map an input value or input features to one of a set of predefined output scores or recommendations, and modify or adapt the mapping in response to historical data returned from previous iterations (e.g., measured elevations, such as those prepared in elevation certificates and/or performed to verify the predicted elevation).

Alternatively or additionally, the trained model may be trained to extract one or more features from historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data. In some examples, the historical data may comprise data that has been generated using user input, crowd based input or the like (e.g., user confirmations).

In some examples, the feature position prediction manager 302 may be configured to apply a trained model to one or more inputs to identify a set of reliability scores. For example, if the input feature was ground elevation data, such as may be obtained from a LiDAR data repository or other LiDAR data source, the feature position prediction manager 302 may apply the ground elevation data to the trained model to determine whether resulting predicted elevation is accurate. In addition, one or more of the new data objects described herein may be used for training the model. In some examples, the trained model would output a suggested reliability score based on other predictions and/or measurements using the same ground-elevation data.

Regardless of the precise configuration of the feature position prediction manager 302, upon receipt of a message request data object (and any necessary extraction or parsing of location identification data and/or other request-related data contained therein) the feature position prediction manager 302 retrieves and/or otherwise receives one or more data objects from the repositories elevation certificate repository 306, the LiDAR data repository 308, and/or one or more of 310A-310N and determines the predicted elevation of an architectural feature of a structure at the location identified in the message request data object. Based on the predicted elevation and/or other position, the feature position prediction manager 302 also generates as output the predicted feature position data set 312 which includes at least the predicted feature elevation and/or position.

Example Processes for Model Training and Deployment

With reference to FIG. 8, an example process flow for developing and implementing a model is shown according to some embodiments discussed herein. In some embodiments, with reference to block 810, data may be collected and stored according to any of the means discussed herein. For example, data may be retrieved and stored in one or more data repositories, and new data may be generated, such as LiDAR data created by the survey vehicle (e.g., survey vehicle 108a shown in FIG. 1) or by prompting a request source system (e.g., request source system 104 shown in FIG. 1). At block 820, the data sets may then be prepared and processed according to the embodiments discussed herein, such as the pre-processing and integration steps shown and described with respect to blocks 710, 720, 730 of FIG. 7. At block 830, feature engineering and feature selection may be performed, such as the steps shown and described with respect to block 740 of FIG. 7.

At block 840, a model is generated based upon the final data set after the aforementioned steps. In some embodiments, the model may be trained by supervised learning using an elevation target variable to generate a model configured to predict feature elevation position data. In some embodiments, the model may be trained or generated according to any embodiment discussed herein.

At block 850, the model may optionally be optimized further before deployment at block 860. After deployment, the model may be accessed and run via a message request data object or other initiation command according to any of the embodiments discussed herein.

With reference to FIG. 9, an example of the model generation process 900 (e.g., block 840 in FIG. 8) may include testing multiple models or combinations of models using various techniques described herein with multiple versions of the available data sets to determine the highest accuracy and precision model. The models may be evaluated and optimized as described herein and a final model selected. In some embodiments, one or more data sets 910a, 910b may be selected from the combination of available data sets and at various levels of cleaning and pre-processing. For example, in one embodiment, a first data set 910a may include all available data, and a second data set 910b may include a most complete data set, which may include the new variables, new data, and selected features described with respect to block 740 of FIG. 7. In some embodiments, multiple data sets may be used for a first iteration of the model generation process and subsequent processes may use the same data set and/or underlying model for further model generation.

For the final data set (e.g., each of data sets 910a, 910b used for model generation), one or more data sampling methods 920a-920d may be used with each of one or more model generation techniques 930a-930h to generate one or more models 940a-940h for validation. In such embodiments, the data sampling methods 920a-920d may divide the data into one or more subsets for upon which the model generation techniques 930a-930h may be used to train and validate the individual models. The individual models may then be compared for accuracy (e.g., based on RMSE). Examples of data sampling methods include the TVH Method of partitioning and Cross-Validation. In the TVH Method, the data set 910a, 910b is partitioned into training, validation, and holdout subsets of data. In some embodiments, the training subset comprises approximately 64% of the initial data set 910a, 910b; the validation subset comprises approximately 16% of the initial data set 910a, 910b; and the holdout subset comprises approximately 20% of the initial data set 910a, 910b. The training set may be labeled for supervised learning, and may be used with each of one or more model generation techniques 930a-930h to generate a model of the relationships between the features and the target variable. In the Cross-Validation method, a dataset can be repeatedly split into training and validation datasets in different ways (e.g., splitting into random or semi-random datasets), for example as shown in FIG. 12. In some embodiments, an n-fold cross-validation technique may be used, such that the dataset 910a, 910b is randomly partitioned into n equal sized subsamples, with a single subsample being retained as a validation set and the remaining sets (n−1) being used as training sets. Cross-validation may then be performed n times, with each of the n subsamples taking a turn as the validation data set. Each of the n results are then averaged to produce a single prediction. In some embodiments discussed herein, 5-fold cross-validation may be used.

At blocks 930a-930h, the respective training sets are used in the learning process of the model generation algorithms to generate models based upon a target variable. Examples of model generation techniques may include any of the machine learning techniques discussed herein. In some example embodiments, a RandomForest Regressor, eXtreme Gradient Boosted Trees Regressor (e.g., XGBoost), or other machine learning algorithm based on decision tree learning or other techniques described herein may be used. Decision trees may create branches in a training data set to break the training data into increasingly homogenous subsets, ending in a final leaf of more-homogenous data. Each branch may be split by calculating a split of an attribute that results in the highest homogeneity of the branches. A RandomForest Regressor algorithm is an ensemble method where hundreds (or thousands) of individual decision trees are fit to bootstrap re-samples of the original training dataset, with each tree being allowed to use a random selection of N variables, where N is a configurable parameter of the algorithm. Ensembling many re-sampled decision trees serves to reduce their variance, producing more stable estimators that generalize well out-of-sample. Random forests are hard to over-fit, are accurate, generalize well, and require little tuning, all of which are desirable properties in a predictive algorithm. Random forests have recently been overshadowed by Gradient Boosting Machines, but enjoy a major advantage in some embodiments in that they are very parallel and therefore scale much better to larger datasets. In one embodiment of the RandomForest Regressor, the "ExtraTrees" model may be used, which is a random forest with more randomness: the splits considered for each variable are also random. This decreases the variance of the model but potentially increases its bias. The ExtraTrees models has an additional advantage in that it is computationally very efficient: no sorting of the input data is required to find the splits, because they are random. This algorithm may be based on scikit-learn estimator sklearn.ensemble- .RandomForestRegressor and on scikit-learn estimator sklearn.ensemble.ExtraTreesRegressor. A Gradient Boosted Trees Regressor may combine weak learners to form a strong learner, beginning with a base regression tree and building subsequent trees on the errors calculated by the previous tree. An extreme Gradient Boosted Trees Regressor (e.g., XGBoost) is a specific implementation of a Gradient Boosted Trees Regressor that uses regularization, parallel processing, missing value handling, tree pruning, and includes cross-validation. The fitted models may then be tested on the validation dataset to tune the parameters and hyperparameters of the model, and the holdout set (in instances using a holdout set) may allow for comparison with an independent data set.

In some embodiments, multiple machine learning algorithms may be combined to combine the predictions of multiple machine learning models into a single, blended model. For example, a Generalized Linear Model (GLM) Blender may use the predictions of several selected models as predictors while keeping the same target (e.g., lowest floor elevation) as the individual models. In some embodiments, a Gaussian distribution GLM Blender may be used. In some example embodiments, a Random ForestRegressor, eXtreme Gradient Boosted Trees Regressor, and RandomForest Regressor (using ordinal encoding of categorical variables) were blended to form a single model. Other examples include an Advanced AVG Blender model.

In the embodiment depicted in FIG. 9, each of the models 940a-940h produced by the various algorithms and data sets are then compared to identify the best model. In some embodiments, the inventors selected the GLM Blender using a blend of a Random ForestRegressor, an eXtreme Gradient Boosted Trees Regressor, and a RandomForest Regressor (using ordinal encoding of categorical variables), such as the example flow shown in the embodiment of FIG. 10, described herein. In some embodiments, machine learning methods may be used to generate the models discussed herein as would be understood by a person skilled in the art in light of this disclosure.

Example Implementations

Some example implementations of embodiments of the invention described and otherwise disclosed herein are particularly advantageous in situations and contexts that involve flood event preparedness and planning. In some such situations, an individual may wish to incorporate insurance coverage (including but not limited to additional insurance coverage) into their flood event preparedness plans. Some example implementations arising in such situations involve offering personalized, additional, flexible, defined-benefit or flat fixed-payout type flood insurance coverage to individuals with existing flood coverage through the use of predictive analytics and machine learning. Some example implementations arise in situations where a local, state, and/or federal regulatory framework imposes requirements involving insuring structures in areas that are susceptible to flood events. Some example implementations arise in contexts where first responders and/or other emergency personnel wish to ascertain areas where the flood-related risks to people and property may be concentrated, and generate instructions and/or predictions for disaster management related to the elevation of an architectural feature on a structure (e.g., the likelihood of rescue being required based on the elevation of the first floor of a home). Regardless of the motivation of assessing and guarding against flood related risks, doing so often requires the determination and/or verification of the elevation of an architectural feature of a structure.

With reference to FIG. 3, a representative of an insurance company tasked with determining and/or verifying the elevation of a feature of a structure may interact with an interactive portion of an insurance company's website and/or mobile application that functions as a user request object interface. As part of this interaction, the representative may convey a message request data object reflecting a request for the elevation of a feature of a particular structure in a particular location. Upon receipt of the message request data object via the user request object interface 304, the feature position prediction manager 302 may extract information from the message request data object. In some example implementations, this extracted information may take the form of a location identification data set (which may include, for example, geographic coordinates and/or other geo-coding data, for example). In some example implementations, the extracted information may also include a unique user identifier, an authenticated indication of the identity of the user, and/or other information that identifies the user to the feature position prediction manager 302 (and, for example, the insurance company and/or other service provider associated with the feature position prediction manager 302). In some example implementations, the extracted information may also contain an additional request data set, which may reflect and/or otherwise convey the nature and scope of the inquiry made by the representative with respect to the elevation and/or other position of the architectural feature of the structure. For example, this additional request data set may include a user's answers to prompts or questions regarding the structure and/or other data points that are observable and/or otherwise ascertainable by the representative.

Once the feature position prediction manager 302 has extracted the relevant information from the representative's message request data object, the feature position prediction manager 302 may request and receive any of a number of location context data objects related to the location and/or the likely elevation of the feature of the structure from the data repositories 306, 308, and 310A-310N. In some example implementations, one such data repository is the elevation certificate data repository 306, which is capable of providing data objects and/or data sets pertaining to measurements of features of other structures in other locations (e.g., a small percentage of properties may have true elevation certificate data). In some example implementations, one such repository is LiDAR data repository 308, which is capable of providing data objects and/or other data sets pertaining to LiDAR-derived ground-elevation and/or other elevation data. In some example implementations, the repositories involved include population data repository 310A (which may, for example, include information gathered as part of a census or other population assessment), land use data repository 310B (which may, for example, include information pertaining to land use and/or rules governing land use), land coverage data repository 310C (which may, for example, include information regarding the extent and characteristics of land coverage in a given area), property characteristic data repository 310D (which may, for example, include information pertaining to the structure located on a particular parcel of land, such as number of floors, foundation type, attached garage (y/n), basement(y/n), machinery in garage/basement/crawlspace, flood vents in garage/main structure, number of net steps to first finished floor, number of net steps to basement/subgrade crawlspace, obstructions in elevated space, and the like) and/or another data repository (which is represented by data repository 310N), each of which are capable of providing data objects and/or other data sets for use by feature position prediction manager 302. As described herein, one or more of these data repositories may be incomplete for a desired geographic location, and the model may, in some examples using supplemental data (e.g., ranging data objects), predict the elevation of an architectural feature of a structure at a geographic location. In some embodiments, a goal of the present systems, methods, and apparatus is to use a plurality of incomplete data sources to create a robust data model from which to train a robust model to predict elevation data objects associated with architectural features (e.g., lowest floor elevation) of structures across the United States.

In example implementations that arise in the context of an insurance company representative requesting information about the elevation of one or more features of a structure, the representative may be able to access information about the relationship between an entity associated with the structure and the insurance company and/or other entity associated with the feature position prediction manager 302. As such, the request data object and/or one or more location context data objects may be associated with a representative and/or customer of the insurance company, and, the information extracted from one or more data objects set may include a customer (or representative) identification number. The feature position prediction manager 302 may use this identification number (or, for example, an authentication token and/or other authenticated indication of the identity of the customer or representative) to retrieve the customer records associated with the location and incorporate those records into a prediction of the elevation of a feature of a structure associated with the customer.

Upon receipt of the various data objects associated with a location, the structure at the location and/or the elevation of features of other structures at other locations as reflected in the user's message request, the feature position prediction manager 302 may apply the data objects to a first model, which, as discussed herein, may be a machine learning model capable of performing data analytics to predict an elevation and/or other position of a feature of a structure. In some example implementations, the model is a geospatial machine learning model, and upon application of the location context data objects and/or related data sets to the geospatial machine learning model, the a predicted elevation of a finished floor of the structure is determined.

Once the elevation and/or position of the architectural features of the structure has been determined and retrieved, the feature position prediction manager 302 and/or a communication interface associated therewith may generate a control signal causing a renderable object associated with the predicted feature position data set to be displayed on a user interface of the client device associated with the user. In some embodiments, the control signal may further update one or more of the data repositories with the predicted value to iteratively improve the repositories and model generation process. In example implementations where a company representative interacts with an insurance company system via a device (such as any of the example devices referenced herein with respect to the request source system 104, for example) a renderable object may be transmitted to the representative's device such that the predicted elevation and/or other information contained within the predicted feature position data set can be displayed to and/or interacted with by the representative.

FIG. 4 is a flow chart of an example process 400 for predicting an elevation and/or other position of an architectural feature of a structure. As shown at block 402, process 400 begins with receiving a message request data object from a user. The message request data object may incorporate a wide range of information and be expressed in any format that allows for the transmission of a message request data object from a system associated with a user, such a request source system 104, for example, to a machine learning model and/or a system associated with such a model. In general, a message request data object will incorporate information sufficient to identify a geographic location at or near the structure associated with the request. In some example implementations of block 402, the message data request may also include an authenticated indication of the identity of the user.

As shown at block 404, process 400 continues with the extraction of a location identification data set for a first location from the message request data object. As discussed herein, the location identification data set may include information sufficient to identify the location at which the relevant structure is located, for example. In some example implementations, the location identification data set includes a set of geographic coordinates for the first location, namely, the location of the structure to be assessed. In some example implementations (such as those that involve large structures and/or structures integrated into highly varied terrain, for example) the geographic coordinates may specify the location of a particular architectural feature of the structure, such as the location of a door, window, and/or other access point through which flood water may invade the structure.

In blocks 406 and 408, the process 400 involves the receipt of a series of location context data objects. The location data objects received in blocks 406 and 408 may include any of the location context data objects discussed herein and/or may incorporate into data objects any of the location context data discussed herein, including but not limited to one or more LiDAR data sets, one or more land use data sets, one or more land coverage data sets, one or more census and/or other population data sets, and/or one or more data sets incorporating data obtained from one or more elevation certificates and/or otherwise incorporating an identification of a position of feature of a structure. As set out in process 400, example implementations of block 406 involve location context data objects and data sets associated with the first location (i.e., the location at which the structure that is the subject of the message request data object is found). In such example implementations, the location context data objects and/or data sets received in connection with block 406 provide data that pertains to and/or otherwise provides context for the first location and the structure at that location. As set out in process 400, example implementations of block 408 involve location context data objects associated with a second geographic location. In such example implementations (and particularly in such example implementations where the second location data object includes one or more identifications of the elevations of features of a structure at the second geographic location), the location data objects received in connection with block 408 allow for a predictive model to obtain data from which an unknown elevation of a structure at the first geographic location may be extrapolated. For example, the second location context data object may include information regarding locations and/or structures that are nearby the first location and/or share one or more aspects that provide a basis for extrapolation. The location context data objects may, in some instances, include the one or more new data objects described herein.

As shown in block 412, process 400 also includes using a machine learning model (such as through the application of the received location context data objects and location identification data set, for example) to generate and/or otherwise retrieve a predicted feature elevation position data set. In some example implementations, the model may be a geospatial machine learning model, and, upon the application of the first and second location context data objects and the location identification data set to the geospatial machine learning model, the elevation of a finished floor of a structure is predicted.

As shown at block 414, process 400 also includes causing a renderable object with the predicted feature elevation position data set to be displayed on a user device. In some example implementations, the renderable object may be transmitted to a user device and cause the feature elevation and/or other content contained in the predicted feature elevation position data set to be presented to the user in a manner that allows the user to view and interact with the information.

In another example use case, an API may be generated to determine property risk index data objects based upon a predicted elevation position of an architectural feature of a structure. The predictions may be generated using a model as described herein, incorporating and integrating context data objects from LiDAR vehicle surveillance and other databases as described herein. In some embodiments, the predictions and/or data objects related thereto may be stored in a distributed ledger that is updated, verified, and stored in a decentralized manner to enable multiple parties to view and/or edit the ledger for new developments on geographic locations. In some embodiments, a separate ledger may be used for each property, and edit access may be limited to authorized parties independently for each location (e.g., the property owner and one or more independent providers).

Example Cases: Data Processing and Model Development

Several example model development processes according to the embodiments discussed herein were conducted to identify and optimize production models. These examples incorporate at least some of the processes, apparatus, and systems described herein. In an example embodiment, multiple raw data sources were combined and integrated to form a single data set for model production. These raw data sources collectively define location context data objects, which include one or more of (1) request source data objects (e.g., data object signals transmitted via a request source system, such as the request source system 104 shown in FIG. 1) transmitted by the client device (e.g., elevation certificate, foundation type, attached garage, number of steps to first finished floor, basement information including number of steps down to basement, machinery information, and the like prompted at the request source device 104B); (2) data objects from one or more data repositories from one or more sources (e.g., from a context content system 106 as shown in FIG. 1 and/or various data repositories, such as data repositories 306, 310A-310N as shown in FIG. 3), each of which may include partial location context data objects for one or more geographic locations; (3) LiDAR data objects related to one or more geographic locations (e.g., from a location survey system 108 as shown in FIG. 1 and/or a LiDAR data repository 308 as shown in FIG. 3), which may include new data objects after feature engineering, such as the Lowest Adjacent Grade (LAG) and Highest Adjacent Grade (HAG) data computed from ranging data objects based on LiDAR returns.

In an example, the initial data was pre-processed and cleaned and subsequently integrated to generate a location context data set comprising data objects associated with a plurality of geographic locations. In some embodiments, the elevation prediction system (e.g., elevation prediction system 102 shown in FIG. 1) and one or more of the data repositories discussed herein may be collectively part of a provider system, which stores the various data objects associated with the respective repositories. In some embodiments, the data objects collected from sources outside the provider system, which may include the LiDAR data sources, may be stored in a data repository associated with the provider system for faster recall in future predictions. Similarly, predictions, the one or more new data objects, imputed data values, and other newly-created data may be stored in a data repository associated with the provider system for use as part of the location context data objects for future predictions.

With regard to item (2), the data objects from the one or more data repositories, the data repositories (e.g., repositories 306, 310A-310N in FIG. 3) included policy data objects from a coverage policy database; data objects from a standardization database; data objects from a third party geographic database; and data objects from a flood risk database. At least some of the data objects from the databases were incomplete as to at least a portion of the desired dataset, such that the data was cleaned and integrated to form the location context data set for training the models described herein. In some examples, the data objects described herein originate from disparate sources and include incomplete fields or incorrect data entry that cause model training and prediction errors and hinder the function of the LiDAR data if not addressed. Sample data objects provided by the combination of databases with the LiDAR database include Base Flood Elevation, Lowest Adjacent Grade, Highest Adjacent Grade, Lowest Floor Elevation, Elevation Certificate Data, Standardized Address, Latitude, Longitude, Foundation Type, Basement/Crawlspace, Land Use Code, Finish of Exterior Walls, Property Last Updated Date, State Code, Flood Zone, and Distance to 100YR Flood Plain. Samples of further data objects that may be included in the model training process may include additional digital models of elevation, U.S. building records repositories, oblique imagery data (e.g., aerial or ground-based photographs and photograph data), property flood data, weather data, property value, tax data, property attribute data, median elevation data, and third party finished floor elevation data. In some embodiments, redundant data was received from multiple sources, and in some embodiments, no or incomplete data was received for some geographic locations.

Prior to training the model, the data objects were preprocessed in several stages to generate a training data set. The data processing included two levels or preprocessing each with several steps. The goal of the first preprocessing level was to clean and parse the data from each source, generate new data objects, and combine the data into a single data model. The second preprocessing level was used to distinguish between raw features and informative features, and was used to address variable target leakage. For example, model performance may be estimated by saving a portion of a historical dataset for evaluation; however, a problem can occur in the model if the dataset uses information that is not known until an event occurs, causing target leakage. Target leakage refers to a feature whose value cannot be known at the time of prediction (e.g., using the value for "churn reason" from the training dataset to predict whether a customer will churn).

In a first preprocessing step of the first preprocessing level, the sample data objects from multiple sources were integrated into a single dataset. The data objects were related to each other using a custom key (e.g., a "Flood ID" identifier was created and assigned to each property associated with each geographic location). The addresses and other geographic indicators were standardized, geocoded, and appended to the general property attribute data objects and flood risk data objects.

In a second preprocessing step of the first level, redundancies, outdated information, and irrelevant information were removed. For example, redundant data objects for the same geographic locations were removed, and redundant data objects having a time stamp or update time data field were compared and the most recent active records were queried. Data from different sources may be appended with its source information.

In a third pre-processing step, the LiDAR data sets captured by the survey vehicles were added and associated with the respective Flood ID of the existing data objects.

In the fourth preprocessing step of the first level, feature engineering and feature selection was performed on the remaining data set. In the third preprocessing step, missing values may be imputed or replaced with placeholder values. In some embodiments, missing values may be replaced with average values for a particular area. New variables may be created where imputation fails or where further, distinguishing data sets improve the model generation.

In the third preprocessing step, new variables were created from existing variables, while less important variables (e.g., variables tending to influence the prediction less) were removed in some instances. To create new data objects, the LiDAR data was geocoded with latitude and longitude data and a diameter of 50 feet was used to calculate new variables, including a LAG and HAG value for the properties based on LiDAR datasets. In some embodiments, only a LAG value may be used. In some embodiments, a 35 foot diameter was used. In some embodiments, a 30 foot diameter may be preferred. The LiDAR-based data sets described herein In some instances, as described herein, feature engineering and feature selection of the third-preprocessing step were not performed to provide comparative results with and without feature engineering and feature selection. In total, 65 new features were created to prepare the data model and 68 unique queries were written to impute missing values into the dataset. During feature engineering, in some embodiments, additional new data objects may be generated as composites of multiple other new and preexisting data objects as described herein, and in some embodiments, inconsistent data may be discarded.

In the second level of processing for model generation, the data objects in the processed data set were analyzed to assess the correlation and importance of each variable. In one example, a target variable of Elevation of Lowest Floor was set and correlations were determined for each of the available data objects. Listed below in Table 1 are the top numeric variables by correlation to Elevation of Lowest Floor in this example, which corresponds to the data shown in FIG. 11:

TABLE 1

| Variable No. | Numeric Variables | Correlation to Elevation of Lowest Floor |
|---|---|---|
| 1 | NEW LAG | 100% |
| 2 | NEW Average LAG for Zip Code | 94% |
| 3 | NEW Average Lowest Floor Elevation for City | 90% |
| 4 | NEW Average HAG for Zip Code | 87% |
| 5 | NEW Combined Base Flood Elevation | 87% |
| 6 | NEW Average Lowest Floor Elevation for County | 87% |
| 7 | NEW Base Flood Elevation | 86% |
| 8 | NEW Average Lowest Floor Elevation for State | 75% |
| 10 | Postal Code | 29% |
| 11 | LiDAR-computed HAG | 26% |
| 12 | LiDAR-computed LAG | 26% |

Each of the above-identified variables will be briefly described. The variables identified as "NEW" represent mean-encoded or otherwise computed fields of two or more raw or intermediate sub-variables. With respect to an example model, the above-identified variables may have the following calculation process:

"NEW LAG" may represent a combination of LAG values from LiDAR calculation and other data repositories. For example, some properties may have a stored LAG value (e.g., from an elevation certificate or third party data source) and some properties may have a computed LiDAR value (e.g., the new LAG calculation from ranging data objects described elsewhere herein. In some embodiments, the stored LAG value, if available, was used as the default, and the computed LiDAR LAG value was used when the stored LAG value was a null or placeholder value. A similar value may be used for NEW HAG.

"NEW Average LAG for Zip Code" may represent a mean encoding of NEW LAG at the zip code level. In instances in which NEW LAG is null, an average LAG for the zip code may be calculated and added to the NEW LAG dataset.

"NEW Average Lowest Floor Elevation for City" may represent a mean encoding of lowest floor elevation (LFE) data by city. The LFE data may be derived from the data repositories (e.g., elevation certificate data, survey data, third party data, and the like) and an average taken for a city. Although LFE data is not available for every property, there may be sufficient properties within a city to allow for mean encoding.

"NEW Average HAG for Zip Code" may represent a mean encoding of a NEW HAG variable (similar to NEW LAG discussed above) at the zip code level. In instances in which NEW HAG is null, an average HAG for the zip code may be calculated and added to the NEW HAG dataset.

"NEW Combined Base Flood Elevation" may combine two or more external sources for which Base Flood Elevation (BFE) is available. BFE is the elevation at which there is a 1% chance per year of flooding. The NEW combined BFE has a better predictive power than the raw BFE.

"NEW Average Lowest Floor Elevation for County" may represent a mean encoding of lowest floor elevation (LFE) data by county. The LFE data may be derived from the data repositories (e.g., elevation certificate data, survey data, third party data, and the like) and an average taken for a county. Although LFE data is not available for every property, there may be sufficient properties within a county to allow for mean encoding.

"NEW Base Flood Elevation" includes a raw BFE dataset having one or more preprocessing steps performed for machine learning model training. For example sentinel values (e.g., '−9999.0', '9999.9', '9999.0') may be converted to a common value for model training.

"NEW Average Lowest Floor Elevation for State" may represent a mean encoding of lowest floor elevation (LFE) data by state. The LFE data may be derived from the data repositories (e.g., elevation certificate data, survey data, third party data, and the like) and an average taken for a state. Although LFE data is not available for every property, there may be sufficient properties within a state to allow for mean encoding.

"Postal Code" represents the five digit postal code associated with the properties.

"LiDAR-computed HAG" is the HAG value calculated based on the LiDAR ranging data objects and predetermined diameter as described in the embodiments herein.

"LiDAR-computed LAG" is the LAG value calculated based on the LiDAR ranging data objects and predetermined diameter as described in the embodiments herein.

FIG. 11 depicts a chart of cross-correlation between each of the above-referenced variables and several additional variables tested during this process in which the number values (for the lower and left side of the chart) and the size and darkness of the circles relate the correlation, with longitude (18) being the only negative correlation.

In addition, a RandomForest Regressor Feature Importance was calculated after the fact (84% sample size) for the final data set, which identified the NEW LAG (100%), the NEW Base Flood Elevation (58%), the NEW Combined Base Flood Elevation (46%), the NEW Average LAG for Zip Code (21%), and NEW Average Lowest Floor Elevation for City (15%) as the most important features. Feature Importance is determined by the increase in the prediction error of the model after permuting the feature's values. Based upon these results, feature selection may be performed to remove less important variables or identify possible new variables for computation.

In one example, during model development, several models were developed using two data sets. A first data set included all available data, with no Feature Engineering to add new variables and no Feature Selection to remove variables. For example, the first dataset lacked the "New" variables referenced herein. A second data set included the result of both Feature Engineering and Feature Selection. In the example, 118 models were generated using the first data set and 92 models were developed using the second data set before determining that the second data set was superior. With reference to FIG. 9, the models were generated according to the depicted process, with data set 1 910a corresponding to the first data set and data set 2 910b corresponding to the second data set. TVH partitioning and Cross-Validation techniques were used for each, with the partition percentages generally using 64% Training, 16% Validation, and 20% Holdout sets and a 5-fold cross-validation. Using Cross-Validation, model performance was better able to be estimated because root mean squared error (RMSE) is estimated on all individual 5-folds before averaging.

In the final model development process, a raw data set of 312,000 data objects (e.g., properties/observations) was used with a total of 255 features for the machine learning model. Elevation of Lowest Floor was set as the target variable, and cross-validation was used to partition the data for modeling. For evaluation, all models were evaluated on the basis of at least one of MAE and RMSE. Batch Predictions were made on the entire data set, while model validation can be primarily performed on the holdout set of data objects. An example of the cross-validation data partitioning is shown in FIG. 12.

Model evaluation and model selection was performed using validation and cross-validation scores for each model. The final selected model was the Generalized Linear Model (Gaussian Distribution) Blender (GLM Blender) described above and shown in FIG. 10 that combines the RandomForest Regressor model, the eXtreme Gradient Boosted Trees Regressor, and the RandomForest Regressor model using ordinal encoding of categorical variables. The GLM Blender model showed mean absolute error (MAE) results of 1.87 feet and showed RMSE results of 5.8849 feet (validation), 4.5740 feet (cross-validation), and 4.5018 feet (holdout) using the second data set (with feature engineering and feature selection). Thus, the model was able to predict the elevation of the lowest floor of a structure with accuracy. With reference to Tables 2-4 below, the final parameters (hyperparameters in the case of the RandomForest Regressor model) are shown.

TABLE 2

RandomForest Regressor Hyperparameters

| | |
|---|---|
| 1. | Missing values imputed |
| 2. | Forest = 1 |
| 3. | Max_Features = 0.3 |
| 4. | Folds = 5 |
| 5. | Random State = 1234 |
| 6. | Min_Samples_Split = 2 |
| 7. | Max_Depth = 10 |
| 8. | Stepwise.Backwards = 0 |
| 9. | N_Estimators = 100 |
| 10. | Min_samples_leaf = 5 |
| 11. | Test_Fraction = 0.25 |

TABLE 3 eXtreme Gradient Boosted Trees Regressor Parameters

| | |
|---|---|
| 1. | Ordinal encoding of categorical variables |
| 2. | Converter for text mining |
| 3. | Missing values imputed |
| 4. | PostProcessing: left_censoring: None |
| 5. | PostProcessing: wordcloud: False |
| 6. | PreProcessing: frozen parameters lid: None |
| 7. | min_child_weight: 1.0 |
| 8. | missing_value: 0.0 |
| 9. | tweedie_p: 1.5 |
| 10. | PostProcessing: predictions_to_boost: False |
| 11. | PostProcessing: stack_margin: False |
| 12. | PostProcessing: stack_folds: 5 |
| 13. | smooth_interval: 200 |
| 14. | Forest: random_state: 1234 |
| 15. | PostProcessing: stack: True |
| 16. | PostProcessing: right_censoring: None |
| 17. | random_state: 153 |
| 18. | max_bin: 256 |
| 19. | PreProcessing: language: None |
| 20. | min_split_loss: 0.01 |
| 21. | max_depth: [3, 5, 7] |
| 22. | mono_up: None |
| 23. | Stepwise: backwards: 0 |
| 24. | reg_alpha: 0.0 |
| 25. | loss: ls |
| 26. | mono_down: None |
| 27. | colsample_bylevel: 1.0 |
| 28. | scale_pos_weight: 1.0 |
| 29. | max_delta_step: 0.0 |
| 30. | learning_rate: 0.05 |
| 31. | PostProcessing: prime_alpha_index: None |
| 32. | base_margin_initialize: False |
| 33. | n_estimators: 5000 |

TABLE 3-continued

| eXtreme Gradient Boosted Trees Regressor Parameters | |
|---|---|
| 34. | Forest: n_jobs: 1 |
| 35. | tree_method: hist |
| 36. | num_parallel_tree: 1 |
| 37. | PostProcessing: move_imputed: False |
| 38. | colsample_bytree: 0.2 |
| 39. | Forest: n_estimators: 1 |
| 40. | Stepwise: test_fraction: 0.25 |
| 41. | interval: 10 |
| 42. | PostProcessing: stage: None |
| 43. | subsample: 1.0 |
| 44. | reg_lambda: 1.0 |
| 45. | PostProcessing: stack_sequential: False |
| 46. | Decay: Type: None |
| 47. | PreProcessing: balance_weights: False |

TABLE 4

| RandomForest Regressor Parameters | |
|---|---|
| 1. | Ordinal encoding of categorical variables |
| 2. | Missing values imputed |
| 3. | Forest = 1 |
| 4. | Max_Features = 0.3 |
| 5. | Folds = 5 |
| 6. | Random State = 1234 |
| 7. | Min_Samples_Split = 2 |
| 8. | Max_Depth = 10 |
| 9. | Stepwise.Backwards = 0 |
| 10. | N_Estimators = 100 |
| 11. | Min_samples_leaf = 5 |
| 12. | Test_Fraction = 0.25 |

Baseline models were created using the first data set to assess the value of feature engineering and feature selection, and the best performing baseline model (GLM Blender of Decision Tree Regressor, Light Gradient Boosted Trees Regressor with Early Stopping, and eXtreme Gradient Boosted Trees Regressor with Early Stopping) showed a mean absolute error (MAE) of 4.09 feet and RMSE results of 36 feet (validation/cross validation) and 32.0890 feet (holdout). Thus, the feature engineering and feature selection process showed significant improvement.

In some embodiments, preprocessing may include additional steps to reduce MAE and RMSE, such as excluding fields with more than 60% null values; excluding features with lowest floor elevation at 0; excluding features with a large difference in elevation between the lowest adjacent grade and lowest floor elevation (e.g., >20 ft); excluding features with null ID fields; excluding features with missing key parameters by removing features with parameters (e.g., LiDAR data, the elevation of the lowest floor, base flood elevation, etc.) set to a placeholder value (e.g., 9999.0, 9999.9, −9999.9, −9999.9).

In some embodiments, the data set may be improved by adding new sources, such as photos and appraisal and underwriting documents, and by updating records for each geographic location (e.g., for a property, parcel, geographic coordinate location, or other location identifier) on the fly. In some embodiments, the elevation certificates may be scanned via OCR to import into the data repositories.

Model Testing Examples

Several model comparisons and dataset comparisons were conducted to validate the systems, methods, and apparatus described herein and to provide additional examples thereof.

In some example embodiments, analysis was conducted to determine sub-sets of data on which one or more of the tested models may be successful. In some instances, a model based on a chosen sub-set of the data may be more accurate than a model based on the entire dataset. For example, in some instances, a model may be less effective for a nation-wide dataset than for a specific sub-area. While not wishing to be bound by any particular theory, these scaling and data set accuracy differences may relate to the quality of data in certain areas or to the relevance of certain features to predicting elevation values in certain areas.

In one example, models were generated using only properties whose corresponding data indicated a slab foundation, and removing a data value corresponding to the elevation difference between the data repository LFE and the NEW LAG value. For this dataset, the XGBoost model proved most accurate with a Cross-Validation error of 0.88 ft and a Holdout (unseen data) error of 0.86 ft.

In another example, models were generated using only valid data objects (e.g., data having a non-null BFE and a non-null LiDAR data set) and by removing non-informative features. For this dataset, the XGBoost model proved most accurate with a Cross-Validation error of 1.03 ft and a Holdout (unseen data) error of 0.97 ft.

In another example, models were generated using the top 30 most predictive features from all available properties. For this dataset, the RandomForest model proved most accurate with a Cross-Validation error of 1.21 ft and a Holdout (unseen data) error of 1.18 ft.

In an example, models were generated using the informative features from only Florida-based properties. For this dataset, the Gradient Boosted Trees model proved most accurate with a Cross-Validation error of 0.72 ft and a Holdout (unseen data) error of 0.71 ft.

In some further tests, a LAG only model (e.g., a model without HAG data) may be used, and a basement-type-based model (e.g., including only properties with basements or excluding properties with basements) may be used.

Model based systems allow for rapid prototyping and optimization by trying many models quickly. Model predictions may also be scaled to large datasets, saving time and resources. Moreover, the prediction may be made independent of elevation data.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

The subject matter described herein includes, but is not limited to, the following specific embodiments, any combination or subcombination of which may be claimed in addition to the embodiments described herein:

1. A system for determining an elevation position of an architectural feature of a structure, the system comprising:
a survey vehicle comprising at least one sensor configured to transmit ranging signals towards one or more structures, receive returns from a reflection of the ranging signals, and generate ranging data objects based on the returns;
a client device associated with a user configured to generate a message request data object and display a renderable object on a user interface;
at least one elevation prediction apparatus comprising at least one processor and at least one memory comprising computer program code, the at least one memory and the computer program code configured to, with the at least one processor, cause the at least one elevation prediction apparatus to:
receive the message request data object from the client device;
extract, from the message request data object, a location identification data set, wherein the location identification data set is associated with a first geographic location;
receive a first location context data object, wherein the first location context data object is associated with the first geographic location and based at least in part on the ranging data object;
receive a second location context data object, wherein the second location context data object is associated with a second geographic location;
retrieve a predicted feature elevation position data set, wherein retrieving the predicted feature elevation position data set comprises applying the location identification data set, the first location context data object, and the second location context data object to a first model; and
generate a control signal causing the renderable object comprising the predicted feature elevation position data set to be displayed on the user interface of the client device associated with the user.

2. The system of embodiment 1, wherein the message request data object comprises an authenticated indication of the identity of the user.

3. The system of embodiment 1 or embodiment 2, wherein the location identification data set comprises a geographic coordinates set for the first geographic location.

4. The system of any one of embodiments 1-3, wherein the first location context data object comprises a light detection and ranging (LiDAR) data set associated with the first geographic location.

5. The system of any one of embodiments 1-4, wherein at least one of the first location context data object and the second location context data object includes one or more calculated elevation values based on the ranging data objects.

6. The system of embodiment 5, wherein the system is configured to calculate the one or more calculated elevation values based upon the ranging data objects in an instance in which the one or more calculated elevation values are missing from an initial data object.

7. The system of embodiment 5 or embodiment 6, wherein the at least one sensor comprises a LiDAR sensor and wherein the one or more calculated elevation values are based on LiDAR data returns.

8. The system of any one of embodiments 5-7, wherein the one or more calculated elevation values comprise at least one of highest adjacent grade value or a lowest adjacent grade value.

9. The system of any one of embodiments 1-8, wherein the second location context data object comprises an identification of an elevation position of an architectural feature of a second structure located at the second geographic location.

10. The system of any one of embodiments 1-9, wherein the predicted feature elevation position data set comprises a predicted elevation position of the architectural feature of the structure located at the first geographic location.

11. The system of any one of embodiments 1-10, wherein the first model is a geospatial machine learning model.

12. The system of embodiment 11, wherein retrieving the predicted feature elevation position data set comprises:
applying the location identification data set, the first location context data object, and the second location context data object to the geospatial machine learning model; and
determining, by the geospatial machine learning model, a predicted finished floor elevation position of the structure located at the first geographic location.

13. An apparatus for determining an elevation position of an architectural feature of a structure, the apparatus comprising at least one processor and at least one memory comprising computer program code, the at least one memory and the computer program code configured to, with the at least one processor, cause the apparatus to:
receive a message request data object from a client device associated with a user;
extract, from the message request data object, a location identification data set, wherein the location identification data set is associated with a first geographic location;

receive a first location context data object, wherein the first location context data object is associated with the first geographic location;

receive a second location context data object, wherein the second location context data object is associated with a second geographic location;

retrieve a predicted feature elevation position data set, wherein retrieving the predicted feature elevation position data set comprises applying the location identification data set, the first location context data object, and the second location context data object to a first model; and generate a control signal causing a renderable object comprising the predicted feature elevation position data set to be displayed on a user interface of the client device associated with the user.

14. The apparatus of embodiment 13, wherein the message request data object comprises an authenticated indication of the identity of the user.

15. The apparatus of embodiment 13 or embodiment 14, wherein the location identification data set comprises a geographic coordinates set for the first geographic location.

16. The apparatus of embodiment 15, wherein the geographic coordinates set defines a geographic location of the architectural feature of the structure located at the first geographic location.

17. The apparatus of any one of embodiments 13-16, wherein the first location context data object comprises a light detection and ranging (LiDAR) data set associated with the first geographic location.

18. The apparatus of embodiment 17, wherein the first location context data object further comprises a land use data set associated with the first geographic location.

19. The apparatus of embodiment 17 or embodiment 18, wherein the first location context data object further comprises a land coverage data set associated with the first geographic location.

20. The apparatus of any one of embodiments 17-19, wherein the first location context data object further comprises a census data set associated with the first geographic location.

21. The apparatus of any one of embodiments 13-20, wherein the second location context data object comprises an identification of an elevation position of an architectural feature of a second structure located at the second geographic location.

22. The apparatus of any one of embodiments 13-21, wherein the predicted feature elevation position data set comprises a predicted elevation position of the architectural feature of the structure located at the first geographic location.

23. The apparatus of any one of embodiments 13-22, wherein the first model is a geospatial machine learning model.

24. The apparatus of embodiment 23, wherein retrieving the predicted feature elevation position data set comprises:

applying the location identification data set, the first location context data object, and the second location context data object to the geospatial machine learning model; and determining, by the geospatial machine learning model, a predicted finished floor elevation position of the structure located at the first geographic location.

25. A method for predicting an elevation of an architectural feature of a structure at a geographic location, the method comprising:

receiving a message request data object from a client device associated with a user;

extracting, from the message request data object, a location identification data set, wherein the location identification data set is associated with a first geographic location;

receiving a first location context data object, wherein the first location context data object is associated with the first geographic location;

receiving a second location context data object, wherein the second location context data object is associated with a second geographic location;

retrieving a predicted feature elevation position data set, wherein retrieving the predicted feature elevation position data set comprises applying the location identification data set, the first location context data object, and the second location context data object to a first model; and generating a control signal causing a renderable object comprising the predicted feature position data set to be displayed on a user interface of the client device associated with the user.

26. A system comprising:

a survey vehicle comprising at least one sensor configured to transmit ranging signals towards one or more structures in at least one geographic location, receive returns from a reflection of the ranging signals, and generate ranging data objects based on the returns;

at least one elevation prediction apparatus comprising at least one processor and at least one memory comprising computer program code, the at least one memory and the computer program code configured to, with the at least one processor, cause the at least one elevation prediction apparatus to:

receive the ranging data object based on the returns received by the survey vehicle;

generate one or more new data objects associated with one or more of the at least one geographic location based on the ranging data objects;

generate a predictive model using the one or more new data objects;

generate, via the predictive module, a predicted feature elevation position data set of an elevation of an architectural feature of a structure; and generate a control signal causing a renderable object comprising the predicted feature elevation position data set to be displayed on the user interface of the client device associated with the user.

27. The system according to embodiment 26, wherein the ranging data object comprises a light detection and ranging (LiDAR) data set associated with the at least one geographic location.

28. The system according to embodiment 26 or embodiment 27, wherein the at least one memory and the computer program code are configured to, with the at least one processor, cause the at least one elevation prediction apparatus to:

receive location context data objects from at least one database; and combine the one or more new data objects with the location context data objects to generate a combined dataset;

wherein generating the predictive model using the one or more new data objects comprises generating the predictive model using the combined dataset.

29. The system according to embodiment 28, wherein the location context data objects, the ranging data object, and the one or more new data objects do not include the elevation of the architectural feature of the structure.

30. The system according to embodiment 28 or embodiment 29, wherein the at least one memory and the computer program code are configured to, with the at least one processor, cause the at least one elevation prediction apparatus to:

compare a first elevation data object associated with the at least one geographic location and the location context data objects with a second elevation data object associated with the at least one geographic location and the ranging data object;

determine, in an instance in which the first elevation data object is different from the second elevation data object by at least a threshold value, that the first elevation data object and the second elevation data object are inconsistent; and discard at least a portion of one of the location context data object or the ranging data object associated with the at least one geographic location.

31. The system according to embodiment 30, wherein discarding at least a portion of one of the location context data object or the ranging data object associated with the at least one geographic location comprises discarding at least a portion of the ranging data object associated with the geographic location.

32. The system according to embodiment 30 or embodiment 31, wherein the first elevation data object associated with the at least one geographic location and the location context data objects comprises an elevation certificate data object.

33. The system according to any one of embodiments 26-32, wherein generating the one or more new data objects comprises defining a geographic region comprising the at least one geographic location, and calculating the one or more new data objects based on the ranging data objects within the geographic region.

34. The system according to embodiment 33, wherein the at least one memory and the computer program code are configured to, with the at least one processor, cause the at least one elevation prediction apparatus to:

identify a coordinate location associated with the at least one geographic location, and define the geographic region as a diameter about the coordinate location.

35. The system according to embodiment 34, wherein generating the one or more new data objects further comprises at least one of:

defining a highest point in the geographic region as a highest adjacent grade data object; or defining a lowest point in the geographic region as a lowest adjacent grade data object.

36. The system according to any one of embodiments 26-35, wherein the at least one memory and the computer program code are configured to, with the at least one processor, cause the at least one elevation prediction apparatus to:

store the predicted feature elevation position data set in a location context database.

37. The system according to embodiment 36, wherein the at least one memory and the computer program code are configured to, with the at least one processor, cause the at least one elevation prediction apparatus to:

generate a second predictive model using the predicted feature elevation position data set.

38. An elevation prediction apparatus comprising at least one processor and at least one memory comprising computer program code, the at least one memory and the computer program code configured to, with the at least one processor, cause the at least one elevation prediction apparatus to:

receive ranging data objects associated with at least one geographic location based on returns received by a survey vehicle;

generate one or more new data objects associated with one or more of the at least one geographic location based on the ranging data object;

generate a predictive model using the one or more new data objects;

generate, via the predictive module, a predicted feature elevation position data set of an elevation of an architectural feature of a structure; and generate a control signal causing a renderable object comprising the predicted feature elevation position data set to be displayed on the user interface of the client device associated with the user.

39. The apparatus according to embodiment 38, wherein the ranging data object comprises a light detection and ranging (LiDAR) data set associated with the at least one geographic location.

40. The apparatus according to embodiment 38 or embodiment 39, wherein the at least one memory and the computer program code are configured to, with the at least one processor, cause the at least one elevation prediction apparatus to:

receive location context data objects from at least one database; and combine the one or more new data objects with the location context data objects to generate a combined dataset;

wherein generating the predictive model using the one or more new data objects comprises generating the predictive model using the combined dataset.

41. The apparatus according to embodiment 40, wherein the location context data objects, the ranging data object, and the one or more new data objects do not include the elevation of the architectural feature of the structure.

42. The apparatus according to embodiment 40 or embodiment 41, wherein the at least one memory and the computer program code are configured to, with the at least one processor, cause the at least one elevation prediction apparatus to:

compare a first elevation data object associated with the at least one geographic location and the location context data objects with a second elevation data object associated with the at least one geographic location and the ranging data object;

determine, in an instance in which the first elevation data object is different from the second elevation data object by at least a threshold value, that the first elevation data object and the second elevation data object are inconsistent; and discard at least a portion of one of the location context data object or the ranging data object associated with the at least one geographic location.

43. The apparatus according to embodiment 42, wherein discarding at least a portion of one of the location context data object or the ranging data object associated with the at least one geographic location comprises discarding at least a portion of the ranging data object associated with the geographic location.

44. The apparatus according to embodiment 42 or embodiment 43, wherein the first elevation data object associated with the at least one geographic location and the location context data objects comprises an elevation certificate data object.

45. The apparatus according to any one of embodiments 38-44, wherein generating the one or more new data objects comprises defining a geographic region comprising the at least one geographic location, and calculating the one or more new data objects based on the ranging data objects within the geographic region.

46. The apparatus according to embodiment 45, wherein the at least one memory and the computer program code are configured to, with the at least one processor, cause the at least one elevation prediction apparatus to:
identify a coordinate location associated with the at least one geographic location, and define the geographic region as a diameter about the coordinate location.

47. The apparatus according to embodiment 45 or embodiment 46, wherein generating the one or more new data objects further comprises at least one of:
defining a highest point in the geographic region as a highest adjacent grade data object; or
defining a lowest point in the geographic region as a lowest adjacent grade data object.

48. The apparatus according to any one of embodiments 38-47, wherein the at least one memory and the computer program code are configured to, with the at least one processor, cause the at least one elevation prediction apparatus to:
store the predicted feature elevation position data set in a location context database.

49. The apparatus according to any one of embodiments 38-48, wherein the at least one memory and the computer program code are configured to, with the at least one processor, cause the at least one elevation prediction apparatus to:
generate a second predictive model using the predicted feature elevation position data set.

50. A method comprising:
receiving ranging data objects associated with at least one geographic location based on returns received by a survey vehicle;
generating one or more new data objects associated with one or more of the at least one geographic location based on the ranging data object;
generating a predictive model using the one or more new data objects;
generating, via the predictive module, a predicted feature elevation position data set of an elevation of an architectural feature of a structure; and
generating a control signal causing a renderable object comprising the predicted feature elevation position data set to be displayed on the user interface of the client device associated with the user.

51. The method according to embodiment 50, wherein the ranging data object comprises a light detection and ranging (LiDAR) data set associated with the at least one geographic location.

52. The method according to embodiment 50 further comprising:
receiving location context data objects from at least one database; and
combining the one or more new data objects with the location context data objects to generate a combined dataset;
wherein generating the predictive model using the one or more new data objects comprises generating the predictive model using the combined dataset.

53. The method according to embodiment 52, wherein the location context data objects, the ranging data object, and the one or more new data objects do not include the elevation of the architectural feature of the structure.

54. The method according to embodiment 52 or embodiment 53 further comprising:
comparing a first elevation data object associated with the at least one geographic location and the location context data objects with a second elevation data object associated with the at least one geographic location and the ranging data object;
determining, in an instance in which the first elevation data object is different from the second elevation data object by at least a threshold value, that the first elevation data object and the second elevation data object are inconsistent; and
discarding at least a portion of one of the location context data object or the ranging data object associated with the at least one geographic location.

55. The method according to embodiment 54, wherein discarding at least a portion of one of the location context data object or the ranging data object associated with the at least one geographic location comprises discarding at least a portion of the ranging data object associated with the geographic location.

56. The method according to embodiment 54 or embodiment 55, wherein the first elevation data object associated with the at least one geographic location and the location context data objects comprises an elevation certificate data object.

57. The method according to any one of embodiments 50-56, wherein generating the one or more new data objects comprises defining a geographic region comprising the at least one geographic location, and calculating the one or more new data objects based on the ranging data objects within the geographic region.

58. The method according to embodiment 57 further comprising:
identifying a coordinate location associated with the at least one geographic location, and
define the geographic region as a diameter about the coordinate location.

59. The method according to embodiment 57 or embodiment 58, wherein generating the one or more new data objects further comprises at least one of:
defining a highest point in the geographic region as a highest adjacent grade data object; or
defining a lowest point in the geographic region as a lowest adjacent grade data object.

60. The method according to any one of embodiments 38-59 further comprising storing the predicted feature elevation position data set in a location context database.

61. The method according to any one of embodiments 38-60 further comprising generating a second predictive model using the predicted feature elevation position data set.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:
1. An apparatus for predicting an elevation position of an architectural feature of a structure, the apparatus comprising at least one processor and at least one memory including computer program code, the at least one memory and the computer program code configured to, with the processor, cause the apparatus to at least:

receive a message request data object from a client device, the message request data object comprising at least a location identification data set associated with a first geographic location;

receive a first location context data object associated with the first geographic location, wherein the first location context data object comprises at least one of ranging data or topographical data;

apply the location identification data set and the first location context data object to a model to predict the elevation position associated with the location identification data set; and cause transmission, to the client device, of the predicted elevation position.

2. The apparatus according to claim 1, wherein the first location context data object is indicative of returned reflection of ranging signals transmitting toward one or more structures.

3. The apparatus according to claim 1, wherein the at least one memory and the computer program code are further configured to, with the processor, cause the apparatus to at least:

receive a second location context data object, wherein the second location context data object is associated with a second geographic location, and wherein the second location context data object is applied with the location identification data set and the first location context data object to predict the elevation position.

4. The apparatus according to claim 1, wherein the at least one memory and the computer program code are further configured to, with the processor, cause the apparatus to at least:

generate a control signal causing a renderable object comprising the elevation position to be displayed on a user interface of the client device.

5. The apparatus according to claim 1, wherein the message request data object is received from the client device via an application programming interface (API), and the predicted elevation position is transmitted to the client device via the API.

6. The apparatus according to claim 1, wherein the model is a machine learning model trained with location context data comprising at least one of ranging data or topographical data and known associated elevation positions.

7. The apparatus according to claim 1, wherein predicting the elevation position associated with the location identification data set comprises predicting a predicted finished floor elevation position.

8. A method for predicting an elevation position of an architectural feature of a structure, the method comprising:

receiving a message request data object from a client device, the message request data object comprising at least a location identification data set associated with a first geographic location;

receiving a first location context data object associated with the first geographic location, wherein the first location context data object comprises at least one of ranging data or topographical data;

applying the location identification data set and the first location context data object to a model to predict the elevation position associated with the location identification data set; and causing transmission, to the client device, of the predicted elevation position.

9. The method according to claim 8, wherein the first location context data object is indicative of returned reflection of ranging signals transmitting toward one or more structures.

10. The method according to claim 8, further comprising:

receiving a second location context data object, wherein the second location context data object is associated with a second geographic location, and wherein the second location context data object is applied with the location identification data set and the first location context data object to predict the elevation position.

11. The method according to claim 8, further comprising:

generating a control signal causing a renderable object comprising the elevation position to be displayed on a user interface of the client device.

12. The method according to claim 8, wherein the message request data object is received from the client device via an application programming interface (API), and the predicted elevation position is transmitted to the client device via the API.

13. The method according to claim 8, wherein the model is a machine learning model trained with location context data comprising at least one of ranging data or topographical data and known associated elevation positions.

14. The method according to claim 8, wherein predicting the elevation position associated with the location identification data set comprises predicting a predicted finished floor elevation position.

15. A computer program product for predicting an elevation position of an architectural feature of a structure, the computer program product comprising at least one non-transitory computer-readable storage medium having computer-executable program code instructions stored therein, the computer-executable program code instructions comprising program code instructions to:

receive a message request data object from a client device, the message request data object comprising at least a location identification data set associated with a first geographic location;

receive a first location context data object associated with the first geographic location, wherein the first location context data object comprises at least one of ranging data or topographical data;

apply the location identification data set and the first location context data object to a model to predict the elevation position associated with the location identification data set; and cause transmission, to the client device, of the predicted elevation position.

16. The computer program product according to claim 15, wherein the first location context data object is indicative of returned reflection of ranging signals transmitting toward one or more structures.

17. The computer program product according to claim 15, wherein the computer-executable program code instructions further comprise program code instructions to:

receive a second location context data object, wherein the second location context data object is associated with a second geographic location, and wherein the second location context data object is applied with the location identification data set and the first location context data object to predict the elevation position.

18. The computer program product according to claim 15, wherein the computer-executable program code instructions further comprise program code instructions to:

generate a control signal causing a renderable object comprising the elevation position to be displayed on a user interface of the client device.

19. The computer program product according to claim 15, wherein the message request data object is received from the client device via an application programming interface (API), and the predicted elevation position is transmitted to the client device via the API.

20. The computer program product according to claim 15, wherein the model is a machine learning model trained with location context data comprising at least one of ranging data or topographical data and known associated elevation positions.

21. The computer program product according to claim 15, wherein predicting the elevation position associated with the location identification data set comprises predicting a predicted finished floor elevation position.

* * * * *